United States Patent
Hjermstad et al.

(10) Patent No.: US 11,790,269 B1
(45) Date of Patent: *Oct. 17, 2023

(54) SYSTEMS AND METHODS FOR GENERATING DYNAMIC MODELS BASED ON TRIGGER EVENTS

(71) Applicant: Experian Information Solutions, Inc., Costa Mesa, CA (US)

(72) Inventors: Erik Peter Hjermstad, Lincoln, NE (US); Tony T. Morris, Huntington Beach, CA (US); Heidi Beth Haupt, Streamwood, IL (US); Jennifer Kuhr Schwartz, Lincoln, NE (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,295

(22) Filed: Sep. 27, 2021

Related U.S. Application Data

(63) Continuation of application No. 16/246,083, filed on Jan. 11, 2019, now Pat. No. 11,157,835.

(51) Int. Cl.
*G06N 20/00* (2019.01)
*G06N 5/025* (2023.01)
(Continued)

(52) U.S. Cl.
CPC ............. *G06N 20/00* (2019.01); *G06F 9/542* (2013.01); *G06F 16/212* (2019.01);
(Continued)

(58) Field of Classification Search
CPC ........ G06N 20/00; G06N 5/025; G06F 9/542; G06F 16/212; G06F 16/2365; G06F 16/337
See application file for complete search history.

(56) References Cited

U.S. PATENT DOCUMENTS

| 4,989,144 A | 1/1991 | Barnett, III |
| 5,120,704 A | 6/1992 | Lechter et al. |

(Continued)

FOREIGN PATENT DOCUMENTS

| EP | 0 749 081 | 12/1996 |
| EP | 1 122 664 | 8/2001 |

(Continued)

OTHER PUBLICATIONS

U.S. Appl. No. 16/246,083, Systems and Methods for Generating Dynamic Models Based on Trigger Events, filed Jan. 11, 2019.

(Continued)

*Primary Examiner* — Pei Yong Weng
(74) *Attorney, Agent, or Firm* — Knobbe Martens Olson & Bear, LLP

(57) ABSTRACT

Embodiments of a system may comprise databases and a processor that accesses a first database and verifies that each of the plurality of client records conforms to a set of formatting guidelines and filters the records in the first database into a vehicle data subfile and a client data subfile, monitors the records in the vehicle and client data subfiles for a trigger event, generates one or more dynamic models for determining a likelihood that a client will perform an action based on the trigger event, applies the generated dynamic model(s) to generate at least one score value associated with the record including the trigger event, and generates a notification including one or more of the generated at least one score value, the one or more trigger event records, and information associated with the one or more trigger event records for transmission to a user.

23 Claims, 8 Drawing Sheets

(51) Int. Cl.
*G06F 16/335* (2019.01)
*G06F 16/23* (2019.01)
*G06F 16/21* (2019.01)
*G06F 9/54* (2006.01)

(52) U.S. Cl.
CPC ........ *G06F 16/2365* (2019.01); *G06F 16/337* (2019.01); *G06N 5/025* (2013.01)

(56) References Cited

U.S. PATENT DOCUMENTS

| | | | |
|---|---|---|---|
| 5,201,010 | A | 4/1993 | Deaton et al. |
| 5,216,612 | A | 6/1993 | Cornett et al. |
| 5,488,360 | A | 1/1996 | Ray |
| 5,532,838 | A | 7/1996 | Barbari |
| 5,587,575 | A | 12/1996 | Leitner et al. |
| 5,630,070 | A | 5/1997 | Dietrich et al. |
| 5,748,098 | A | 5/1998 | Grace |
| 5,765,143 | A | 6/1998 | Sheldon et al. |
| 5,819,234 | A | 10/1998 | Slavin et al. |
| 5,878,403 | A | 3/1999 | DeFrancesco |
| 5,940,812 | A | 8/1999 | Tengel et al. |
| 5,950,169 | A | 9/1999 | Borghesi et al. |
| 5,963,129 | A | 10/1999 | Warner |
| 5,995,947 | A | 11/1999 | Fraser et al. |
| 6,006,201 | A | 12/1999 | Berent et al. |
| 6,038,554 | A | 3/2000 | Vig |
| 6,052,065 | A | 4/2000 | Glover |
| 6,052,068 | A | 4/2000 | Price et al. |
| 6,076,064 | A | 6/2000 | Rose, Jr. |
| 6,126,332 | A | 10/2000 | Cubbage et al. |
| 6,154,152 | A | 11/2000 | Ito |
| 6,182,048 | B1 | 1/2001 | Osborn et al. |
| 6,208,979 | B1 | 3/2001 | Sinclair |
| 6,236,977 | B1 | 5/2001 | Verba et al. |
| 6,259,354 | B1 | 7/2001 | Underwood |
| 6,278,936 | B1 | 8/2001 | Jones |
| 6,282,517 | B1 | 8/2001 | Wolfe et al. |
| 6,330,499 | B1 | 12/2001 | Chou et al. |
| 6,330,546 | B1 | 12/2001 | Gopinathan et al. |
| 6,430,539 | B1 | 8/2002 | Lazarus et al. |
| 6,516,239 | B1 | 2/2003 | Madden et al. |
| 6,587,841 | B1 | 7/2003 | DeFrancesco |
| 6,609,108 | B1 | 8/2003 | Pulliam et al. |
| 6,714,859 | B2 | 3/2004 | Jones |
| 6,738,748 | B2 | 5/2004 | Wetzer |
| 6,754,564 | B2 | 6/2004 | Newport |
| 6,760,794 | B2 | 7/2004 | Deno et al. |
| 6,772,145 | B2 | 8/2004 | Shishido |
| 6,804,606 | B2 | 10/2004 | Jones |
| 6,839,682 | B1 | 1/2005 | Blume et al. |
| 6,904,359 | B2 | 6/2005 | Jones |
| 6,938,021 | B2 | 8/2005 | Shear et al. |
| 6,959,281 | B1 | 10/2005 | Freeling et al. |
| 6,980,963 | B1 | 12/2005 | Hanzek |
| 7,024,418 | B1 | 4/2006 | Childress |
| 7,050,982 | B2 | 5/2006 | Sheinson et al. |
| 7,069,118 | B2 | 6/2006 | Coletrane et al. |
| 7,092,898 | B1 | 8/2006 | Mattick et al. |
| 7,113,853 | B2 | 9/2006 | Hecklinger |
| 7,130,821 | B1 | 10/2006 | Connors et al. |
| 7,181,427 | B1 | 2/2007 | DeFrancesco |
| 7,184,974 | B2 | 2/2007 | Shishido |
| 7,191,058 | B2 | 3/2007 | Laird et al. |
| 7,228,298 | B1 | 6/2007 | Raines |
| 7,288,298 | B2 | 6/2007 | Raines |
| 7,275,083 | B1 | 9/2007 | Seibel et al. |
| 7,366,694 | B2 | 4/2008 | Lazerson |
| 7,392,203 | B2 | 6/2008 | Edison et al. |
| 7,392,221 | B2 | 6/2008 | Nabe et al. |
| 7,418,408 | B1 | 8/2008 | Heppe |
| 7,421,322 | B1 | 9/2008 | Silversmith et al. |
| 7,433,891 | B2 | 10/2008 | Haber et al. |
| 7,444,302 | B2 | 10/2008 | Hu et al. |
| 7,472,088 | B2 | 12/2008 | Taylor et al. |
| RE40,692 | E | 3/2009 | Rose, Jr. |
| 7,505,838 | B2 | 3/2009 | Raines et al. |
| 7,561,963 | B2 | 7/2009 | Brice et al. |
| 7,567,922 | B1 | 7/2009 | Weinberg et al. |
| 7,571,139 | B1 | 8/2009 | Giordano et al. |
| 7,580,856 | B1 | 8/2009 | Pliha |
| 7,590,589 | B2 | 9/2009 | Hoffberg |
| 7,593,893 | B1 | 9/2009 | Ladd et al. |
| 7,596,512 | B1 | 9/2009 | Raines et al. |
| 7,603,293 | B2 | 10/2009 | Chenn |
| 7,610,257 | B1 | 10/2009 | Abrahams |
| 7,630,932 | B2 | 12/2009 | Danaher et al. |
| 7,653,592 | B1 | 1/2010 | Flaxman et al. |
| 7,693,896 | B1 | 4/2010 | Raines |
| 7,739,142 | B2 | 6/2010 | Chand et al. |
| 7,778,841 | B1 | 8/2010 | Bayer et al. |
| 7,788,147 | B2 | 8/2010 | Haggerty et al. |
| 7,835,940 | B2 | 11/2010 | Kowalchuk |
| 7,865,409 | B1 | 1/2011 | Monaghan |
| 7,877,320 | B1 | 1/2011 | Downey |
| 7,925,654 | B1 | 4/2011 | Raines |
| 7,945,478 | B2 | 5/2011 | Hogan et al. |
| 7,945,483 | B2 | 5/2011 | Inghelbrecht et al. |
| 7,962,404 | B1 | 6/2011 | Metzger, II et al. |
| 7,966,210 | B2 | 6/2011 | Hall et al. |
| 7,974,886 | B2 | 7/2011 | Coleman |
| 7,991,689 | B1 | 8/2011 | Brunzell et al. |
| 8,005,759 | B2 | 8/2011 | Hirtenstein et al. |
| 8,005,795 | B2 | 8/2011 | Galipeau et al. |
| 8,036,952 | B2 | 10/2011 | Mohr et al. |
| 8,055,544 | B2 | 11/2011 | Ullman et al. |
| 8,078,524 | B2 | 12/2011 | Crawford et al. |
| 8,104,671 | B2 | 1/2012 | Besecker et al. |
| 8,121,938 | B1 | 2/2012 | Zettner et al. |
| 8,185,417 | B1 | 5/2012 | Brown et al. |
| 8,219,464 | B2 | 7/2012 | Inghelbrecht et al. |
| 8,239,388 | B2 | 8/2012 | Raines |
| 8,244,563 | B2 | 8/2012 | Coon et al. |
| 8,255,243 | B2 | 8/2012 | Raines et al. |
| 8,255,244 | B2 | 8/2012 | Raines et al. |
| 8,285,656 | B1 | 10/2012 | Chang et al. |
| 8,355,983 | B1 | 1/2013 | Parr et al. |
| 8,380,594 | B2 | 2/2013 | Berkman et al. |
| 8,392,334 | B2 | 3/2013 | Hirtenstein et al. |
| 8,438,048 | B1 | 5/2013 | Benavides, III |
| 8,438,170 | B2 | 5/2013 | Koran et al. |
| 8,521,615 | B2 | 8/2013 | Inghelbrecht et al. |
| 8,560,161 | B1 | 10/2013 | Kator et al. |
| 8,577,736 | B2 | 11/2013 | Swinson et al. |
| 8,595,079 | B1 | 11/2013 | Raines et al. |
| 8,600,783 | B2 | 12/2013 | Smith et al. |
| 8,600,823 | B1 | 12/2013 | Raines et al. |
| 8,606,648 | B1 | 12/2013 | Bayer et al. |
| 8,626,560 | B1 | 1/2014 | Anderson |
| 8,630,929 | B2 | 1/2014 | Haggerty et al. |
| 8,645,193 | B2 | 2/2014 | Swinson et al. |
| 8,661,032 | B2 | 2/2014 | Otten et al. |
| 8,725,584 | B1 | 5/2014 | Eager et al. |
| 8,762,191 | B2 | 6/2014 | Lawrence et al. |
| 8,781,846 | B2 | 7/2014 | Swinson et al. |
| 9,020,843 | B2 | 4/2015 | Taira et al. |
| 9,020,844 | B2 | 4/2015 | Taira et al. |
| 9,053,589 | B1 | 6/2015 | Kator et al. |
| 9,053,590 | B1 | 6/2015 | Kator et al. |
| 9,076,276 | B1 | 7/2015 | Kator et al. |
| 9,087,335 | B2 | 7/2015 | Rane et al. |
| 9,105,048 | B2 | 8/2015 | Koran et al. |
| 9,111,308 | B2 | 8/2015 | Taira et al. |
| 9,123,056 | B2 | 9/2015 | Singh et al. |
| 9,129,325 | B2 | 9/2015 | Taira et al. |
| 9,147,217 | B1 | 9/2015 | Zabritski et al. |
| 9,292,860 | B2 | 3/2016 | Singh et al. |
| 9,501,781 | B2 | 11/2016 | Singh et al. |
| 9,646,308 | B1 | 5/2017 | Eager et al. |
| 9,690,820 | B1 | 6/2017 | Girulat, Jr. |
| 9,697,544 | B1 | 7/2017 | Bayer et al. |
| 9,727,904 | B2 | 8/2017 | Inghelbrecht et al. |
| 9,741,066 | B2 | 8/2017 | Eager et al. |
| 9,754,304 | B2 | 9/2017 | Taira et al. |

(56) References Cited

U.S. PATENT DOCUMENTS

| | | |
|---|---|---|
| 9,818,140 B2 | 11/2017 | Inghelbrecht et al. |
| 9,904,933 B2 | 2/2018 | Taira et al. |
| 9,904,948 B2 | 2/2018 | Taira et al. |
| 10,162,848 B2 | 12/2018 | Mohan et al. |
| 10,163,156 B1 | 12/2018 | Shapley et al. |
| 10,217,123 B2 | 2/2019 | Taira et al. |
| 10,269,030 B2 | 4/2019 | Taira et al. |
| 10,269,031 B2 | 4/2019 | Inghelbrecht et al. |
| 10,380,654 B2 | 8/2019 | Hirtenstein et al. |
| 10,409,867 B1 | 9/2019 | Von Busch et al. |
| 10,430,848 B2 | 10/2019 | Cotton et al. |
| 10,489,809 B2 | 11/2019 | Inghelbrecht et al. |
| 10,489,810 B2 | 11/2019 | Taira et al. |
| 10,515,382 B2 | 12/2019 | Taira et al. |
| 10,565,181 B1 | 2/2020 | Hjermstad et al. |
| 10,580,054 B2 | 3/2020 | Cain et al. |
| 10,581,825 B2 | 3/2020 | Poschel et al. |
| 10,740,404 B1 | 8/2020 | Hjermstad et al. |
| 10,853,831 B2 | 12/2020 | Inghelbrecht et al. |
| 10,977,727 B1 | 4/2021 | Smith et al. |
| 11,017,427 B1 | 5/2021 | Badger et al. |
| 11,157,835 B1 | 10/2021 | Hjermstad et al. |
| 11,176,608 B1 | 11/2021 | Smith |
| 11,210,276 B1 | 12/2021 | Smith |
| 11,210,351 B1 | 12/2021 | Von Busch et al. |
| 11,257,126 B2 | 2/2022 | Hirtenstein et al. |
| 11,301,922 B2 | 4/2022 | Smith |
| 11,481,827 B1 | 10/2022 | Cain et al. |
| 11,532,030 B1 | 12/2022 | Smith |
| 11,568,005 B1 | 1/2023 | Von Busch et al. |
| 11,587,163 B1 | 2/2023 | Smith |
| 2001/0044769 A1 | 11/2001 | Chaves |
| 2002/0023051 A1 | 2/2002 | Kunzle et al. |
| 2002/0042752 A1 | 4/2002 | Chaves |
| 2002/0072964 A1 | 6/2002 | Choi |
| 2002/0082978 A1 | 6/2002 | Ghouri et al. |
| 2002/0091706 A1 | 7/2002 | Anderson et al. |
| 2002/0099628 A1 | 7/2002 | Takaoka et al. |
| 2002/0103622 A1 | 8/2002 | Burge |
| 2002/0128960 A1 | 9/2002 | Lambiotte et al. |
| 2002/0161496 A1 | 10/2002 | Yamaki |
| 2002/0193925 A1 | 12/2002 | Funkhouser et al. |
| 2003/0033242 A1 | 2/2003 | Lynch et al. |
| 2003/0036996 A1 | 2/2003 | Lazerson |
| 2003/0041019 A1 | 2/2003 | Vagim, III et al. |
| 2003/0046179 A1 | 3/2003 | Anabtawi et al. |
| 2003/0046223 A1 | 3/2003 | Crawford et al. |
| 2003/0097329 A1 | 5/2003 | Nabe et al. |
| 2003/0101111 A1 | 5/2003 | Dang et al. |
| 2003/0105728 A1 | 6/2003 | Yano et al. |
| 2003/0144950 A1 | 7/2003 | O'Brien et al. |
| 2003/0177481 A1 | 9/2003 | Amaru et al. |
| 2003/0187753 A1 | 10/2003 | Takaoka |
| 2003/0200151 A1 | 10/2003 | Ellenson et al. |
| 2003/0216965 A1 | 11/2003 | Libman |
| 2003/0233323 A1 | 12/2003 | Bilski et al. |
| 2004/0034657 A1 | 2/2004 | Zambo et al. |
| 2004/0039646 A1 | 2/2004 | Hacker |
| 2004/0088228 A1 | 5/2004 | Mercer et al. |
| 2004/0107125 A1 | 6/2004 | Guheen et al. |
| 2004/0128262 A1 | 7/2004 | Nafousi |
| 2004/0163101 A1 | 8/2004 | Swix |
| 2004/0172266 A1 | 9/2004 | Sheinson et al. |
| 2004/0193644 A1 | 9/2004 | Baker et al. |
| 2004/0243506 A1 | 12/2004 | Das |
| 2004/0249532 A1 | 12/2004 | Kelly et al. |
| 2005/0010555 A1 | 1/2005 | Gallivan |
| 2005/0021384 A1 | 1/2005 | Pantaleo et al. |
| 2005/0038580 A1 | 2/2005 | Seim et al. |
| 2005/0113991 A1 | 5/2005 | Rogers et al. |
| 2005/0173524 A1 | 8/2005 | Schrader |
| 2005/0177489 A1 | 8/2005 | Neff et al. |
| 2005/0209892 A1 | 9/2005 | Miller |
| 2005/0234912 A1 | 10/2005 | Roach |
| 2005/0246256 A1 | 11/2005 | Gastineau et al. |
| 2005/0251820 A1 | 11/2005 | Stefanik et al. |
| 2005/0256780 A1 | 11/2005 | Eldred |
| 2005/0267754 A1 | 12/2005 | Schultz et al. |
| 2005/0267774 A1 | 12/2005 | Merritt et al. |
| 2006/0004731 A1 | 1/2006 | Seibel et al. |
| 2006/0010052 A1 | 1/2006 | Willingham |
| 2006/0015425 A1 | 1/2006 | Brooks |
| 2006/0031182 A1 | 2/2006 | Ryan et al. |
| 2006/0041443 A1 | 2/2006 | Horvath |
| 2006/0107560 A1 | 5/2006 | Wong |
| 2006/0149674 A1 | 7/2006 | Cook et al. |
| 2006/0163868 A1 | 7/2006 | Baumann |
| 2006/0178793 A1 | 8/2006 | Hecklinger |
| 2006/0178957 A1 | 8/2006 | LeClaire |
| 2006/0178973 A1 | 8/2006 | Chiovari et al. |
| 2006/0202012 A1 | 9/2006 | Grano et al. |
| 2006/0202862 A1 | 9/2006 | Ratnakar |
| 2006/0206416 A1 | 9/2006 | Farias |
| 2006/0218079 A1 | 9/2006 | Goldblatt et al. |
| 2006/0229799 A1 | 10/2006 | Nimmo et al. |
| 2006/0242039 A1 | 10/2006 | Haggerty et al. |
| 2006/0242046 A1 | 10/2006 | Haggerty et al. |
| 2006/0242050 A1 | 10/2006 | Haggerty et al. |
| 2006/0277141 A1 | 12/2006 | Palmer |
| 2007/0011083 A1 | 1/2007 | Bird et al. |
| 2007/0027791 A1 | 2/2007 | Young et al. |
| 2007/0043487 A1 | 2/2007 | Krzystofczyk et al. |
| 2007/0059442 A1 | 3/2007 | Sabeta |
| 2007/0136163 A1 | 6/2007 | Bell |
| 2007/0156515 A1 | 7/2007 | Hasselback et al. |
| 2007/0162293 A1 | 7/2007 | Malkon |
| 2007/0173993 A1 | 7/2007 | Nielsen et al. |
| 2007/0179798 A1 | 8/2007 | Inbarajan |
| 2007/0179860 A1 | 8/2007 | Romero |
| 2007/0185777 A1 | 8/2007 | Pyle et al. |
| 2007/0192165 A1 | 8/2007 | Haggerty et al. |
| 2007/0226130 A1 | 9/2007 | Haggerty et al. |
| 2007/0226131 A1 | 9/2007 | Decker et al. |
| 2007/0244732 A1 | 10/2007 | Chatterji et al. |
| 2007/0250327 A1 | 10/2007 | Hedy |
| 2007/0271178 A1 | 11/2007 | Davis et al. |
| 2007/0282713 A1 | 12/2007 | Ullman et al. |
| 2007/0288271 A1 | 12/2007 | Klinkhammer |
| 2007/0294163 A1 | 12/2007 | Harmon et al. |
| 2008/0015954 A1 | 1/2008 | Huber et al. |
| 2008/0016119 A1 | 1/2008 | Sharma et al. |
| 2008/0046383 A1 | 2/2008 | Hirtenstein et al. |
| 2008/0059317 A1 | 3/2008 | Chandran et al. |
| 2008/0071882 A1 | 3/2008 | Hering et al. |
| 2008/0097663 A1 | 4/2008 | Morimoto |
| 2008/0120155 A1 | 5/2008 | Pliha |
| 2008/0126137 A1 | 5/2008 | Kidd et al. |
| 2008/0177590 A1 | 7/2008 | Brodsky et al. |
| 2008/0183689 A1 | 7/2008 | Kubota et al. |
| 2008/0183722 A1 | 7/2008 | Lane et al. |
| 2008/0201163 A1 | 8/2008 | Barker et al. |
| 2008/0228635 A1 | 9/2008 | Megdal et al. |
| 2008/0235061 A1 | 9/2008 | Innes |
| 2008/0255897 A1 | 10/2008 | Megdal et al. |
| 2008/0294540 A1 | 11/2008 | Celka et al. |
| 2008/0294546 A1 | 11/2008 | Flannery |
| 2008/0301188 A1 | 12/2008 | O'Hara |
| 2008/0312969 A1 | 12/2008 | Raines et al. |
| 2009/0018996 A1 | 1/2009 | Hunt et al. |
| 2009/0026255 A1 | 1/2009 | Besecker et al. |
| 2009/0055044 A1 | 2/2009 | Dienst |
| 2009/0063172 A1 | 3/2009 | Thomas et al. |
| 2009/0083130 A1 | 3/2009 | Hall et al. |
| 2009/0138290 A1 | 5/2009 | Holden |
| 2009/0144201 A1 | 6/2009 | Gierkink et al. |
| 2009/0187513 A1 | 7/2009 | Noy et al. |
| 2009/0240602 A1 | 9/2009 | Mohr et al. |
| 2009/0240735 A1 | 9/2009 | Grandhi et al. |
| 2009/0271296 A1 | 10/2009 | Romero |
| 2009/0271385 A1 | 10/2009 | Krishnamoorthy et al. |
| 2009/0287370 A1 | 11/2009 | Iwai et al. |
| 2010/0030649 A1 | 2/2010 | Ubelhor |
| 2010/0049538 A1 | 2/2010 | Frazer et al. |
| 2010/0070343 A1 | 3/2010 | Taira et al. |

(56) References Cited

U.S. PATENT DOCUMENTS

| | | |
|---|---|---|
| 2010/0070382 A1 | 3/2010 | Inghelbrecht et al. |
| 2010/0076881 A1 | 3/2010 | O'Grady et al. |
| 2010/0082792 A1 | 4/2010 | Johnson |
| 2010/0088158 A1 | 4/2010 | Pollack |
| 2010/0094664 A1 | 4/2010 | Bush et al. |
| 2010/0153235 A1 | 6/2010 | Mohr et al. |
| 2010/0161486 A1 | 6/2010 | Liu et al. |
| 2010/0174657 A1 | 7/2010 | Stanton, Jr. |
| 2010/0179861 A1 | 7/2010 | Teerilahti et al. |
| 2010/0198629 A1 | 8/2010 | Wesileder et al. |
| 2010/0217616 A1 | 8/2010 | Colson et al. |
| 2010/0223106 A1 | 9/2010 | Hallowell et al. |
| 2010/0293089 A1 | 11/2010 | Peterson et al. |
| 2010/0293181 A1 | 11/2010 | Muller et al. |
| 2010/0299190 A1 | 11/2010 | Pratt et al. |
| 2010/0332292 A1 | 12/2010 | Anderson |
| 2011/0022489 A1 | 1/2011 | Hallowell et al. |
| 2011/0022525 A1 | 1/2011 | Swinson et al. |
| 2011/0040440 A1 | 2/2011 | de Oliveira et al. |
| 2011/0082759 A1 | 4/2011 | Swinson et al. |
| 2011/0137758 A1 | 6/2011 | Bienias |
| 2011/0161115 A1 | 6/2011 | Hampton |
| 2011/0202471 A1 | 8/2011 | Scott et al. |
| 2011/0213641 A1 | 9/2011 | Metzger, II et al. |
| 2011/0264595 A1 | 10/2011 | Anspach et al. |
| 2011/0270706 A1 | 11/2011 | Anspach et al. |
| 2011/0270707 A1 | 11/2011 | Breed et al. |
| 2011/0276467 A1 | 11/2011 | Blackburn et al. |
| 2011/0320241 A1 | 12/2011 | Miller |
| 2012/0005045 A1 | 1/2012 | Baker |
| 2012/0005108 A1 | 1/2012 | Hollenshead et al. |
| 2012/0095927 A1 | 4/2012 | Hirtenstein et al. |
| 2012/0106801 A1 | 5/2012 | Jackson |
| 2012/0109770 A1 | 5/2012 | Seergy et al. |
| 2012/0197699 A1 | 8/2012 | Snell et al. |
| 2012/0221485 A1 | 8/2012 | Leidner et al. |
| 2012/0239637 A9 | 9/2012 | Prakash et al. |
| 2012/0254017 A1 | 10/2012 | Fusco et al. |
| 2012/0265648 A1 | 10/2012 | Jerome et al. |
| 2012/0271850 A1 | 10/2012 | Licata Messana et al. |
| 2012/0331010 A1 | 12/2012 | Christie |
| 2013/0006801 A1 | 1/2013 | Solari et al. |
| 2013/0006809 A1 | 1/2013 | Hollenshead et al. |
| 2013/0159033 A1 | 6/2013 | Weinstock et al. |
| 2013/0173453 A1 | 7/2013 | Raines et al. |
| 2013/0173481 A1 | 7/2013 | Hirtenstein et al. |
| 2013/0238455 A1 | 9/2013 | Laracey |
| 2013/0268298 A1 | 10/2013 | Elkins et al. |
| 2014/0025681 A1 | 1/2014 | Raines |
| 2014/0058956 A1 | 2/2014 | Raines et al. |
| 2014/0082017 A1 | 3/2014 | Miller |
| 2014/0258309 A1 | 9/2014 | Young |
| 2014/0279868 A1 | 9/2014 | Astorg et al. |
| 2014/0358719 A1 | 12/2014 | Inghelbrect et al. |
| 2015/0154608 A9 | 6/2015 | Raines |
| 2015/0213559 A1 | 7/2015 | Raines et al. |
| 2015/0227942 A1 | 8/2015 | Sidman et al. |
| 2015/0310865 A1 | 10/2015 | Fay et al. |
| 2015/0317728 A1 | 11/2015 | Nguyen |
| 2015/0324400 A1 | 11/2015 | Sheck et al. |
| 2015/0332411 A1 | 11/2015 | Bush et al. |
| 2015/0348143 A1 | 12/2015 | Raines et al. |
| 2015/0348145 A1 | 12/2015 | Nakajima |
| 2016/0004742 A1 | 1/2016 | Mohan et al. |
| 2016/0012494 A1 | 1/2016 | Lasini |
| 2016/0048698 A1 | 2/2016 | Sahu et al. |
| 2016/0180428 A1 | 6/2016 | Cain et al. |
| 2016/0217046 A1 | 7/2016 | Lamoureux et al. |
| 2016/0267588 A1 | 9/2016 | Cain et al. |
| 2016/0299905 A1 | 10/2016 | Geyer et al. |
| 2016/0321726 A1 | 11/2016 | Singh et al. |
| 2016/0379486 A1 | 12/2016 | Taylor |
| 2017/0052652 A1 | 2/2017 | Denton et al. |
| 2017/0270490 A1 | 9/2017 | Penilla et al. |
| 2017/0323295 A1 | 11/2017 | Kranzley et al. |
| 2018/0018723 A1 | 1/2018 | Nagla et al. |
| 2018/0107676 A1 | 4/2018 | Vora |
| 2018/0108189 A1 | 4/2018 | Park et al. |
| 2018/0157761 A1 | 6/2018 | Halstead et al. |
| 2018/0165747 A1 | 6/2018 | Patten et al. |
| 2018/0260838 A1 | 9/2018 | New et al. |
| 2018/0349988 A1 | 12/2018 | Shebesta et al. |
| 2019/0295133 A1 | 9/2019 | Hirtenstein et al. |
| 2020/0051102 A1 | 2/2020 | Taira et al. |
| 2020/0065885 A1 | 2/2020 | Smith |
| 2020/0065898 A1 | 2/2020 | Forrester et al. |
| 2020/0265480 A1 | 8/2020 | Swinson et al. |
| 2022/0198527 A1 | 6/2022 | Hirtenstein et al. |

FOREIGN PATENT DOCUMENTS

| | | |
|---|---|---|
| JP | 09-251486 | 9/1997 |
| JP | 10-222559 | 8/1998 |
| JP | 10-261009 | 9/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| JP | 2007-299281 | 11/2007 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2002-0068866 | 8/2002 |
| NZ | 503219 | 8/2003 |
| WO | WO 99/004350 | 1/1999 |
| WO | WO 99/022328 | 5/1999 |
| WO | WO 01/071458 | 9/2001 |
| WO | WO 01/075754 | 10/2001 |
| WO | WO 03/101123 | 12/2003 |
| WO | WO 2007/149941 | 12/2007 |
| WO | WO 2008/022289 | 2/2008 |
| WO | WO 2018/199992 | 11/2018 |

OTHER PUBLICATIONS

"Activant PartExpert with Vehicle Identification Number (VIN) Lookup", Activant Solutions, Inc., Livermore, CA, Copyright 2006, http://counterworks.com/PartExp_DS_092806.pdf, pp. 2.

"AutoConnect Partners with Organic to Build World's Most Comprehensive Online Emporium of Pre-Owned Vehicles", PR Newswire, May 19, 1998, pp. 2.

"Auto Market StatisticsSM:Drive Response with Aggregated Motor Vehicle Information", Experian, Apr. 2007, http://www.experian.com/assets/marketing-services/product-sheets/auto-market-statistics.pdf, pp. 2.

"Appraisal Tool", VAuto Live Market View, Dec. 14, 2007, http://www.vauto.com/vAuto_solution/appraisal.asp, pp. 3.

Autobytel.Com, http://web.archive.org/web/20040806010507//http://autobytel.com/, as archived Aug. 6, 2004, pp. 3.

Bala, Pradip Kumar, "Purchase-Driven Classification for Improved Forecasting in Spare Parts Inventory Replenishment," International Journal of Computer Applications, Nov. 2010, vol. 10, No. 9, pp. 40-45.

Bankrate.com, http://web.archive.org/web/20040809000026/www.bankrate.com/brm/default.asp, as archived Aug. 9, 2004, pp. 3.

"Carfax Teams with Esurance", PR Newswire, May 14, 2001, p. 1.

Cars.com, http://web.archive.org/web/20041010081241/www.cars.com/go/index.jsp?aff=national, as archived Oct. 10, 2004, pp. 2.

Carsdirect.com, http://web.archive.org/web/20040730142836/www.carsdirect.com/home, as archived Jul. 30, 2004, pp. 2.

Checkbook.org, http://web.archive.org/web/20040604192834/www.checkbook.org/auto/carbarg.cfm, as archived Jun. 4, 2004, p. 1.

"Consumer Reports Finds American-Made Vehicles Close Reliability Gap with European-Made Vehicle—As Japanese Continue to Set

(56) References Cited

OTHER PUBLICATIONS

New Benchmarks for the Industry", Consumer Reports: Consumers Union, Yonkers, NY, Apr. 2003, pp. 2.
Cohen et al., "Optimizer: IBM's Multi Echelon Inventory System for Managing Service Logistics", Interfaces, vol. 20, No. 1, Jan.-Feb. 1990, pp. 65-82.
Copeland et al., "Wallet-on-Wheels—Using Vehicle's Identity for Secure Mobile Money", 17th International Conference on Intelligence in Next Generation Networks, 2013, pp. 102-109.
"Driveitaway.com Links with AutoCheck to Provide Car Shoppers Vehicle Histories; Consumers Bidding on Driveitaway.com's Used Auto Auctions Can Now Go Online to Research a Specific Vehicle's History", PR Newswire, Jan. 15, 2001, p. 1.
"Experian Uses SSA-NAME3 to Match 40 to 50 Million Transactions per Month Against an 11.5 Billion Row Database", DM Review, Apr. 2001, vol. 11, No. 4, pp. 3.
Farrell et al., "Installed Base and Compatibility: Innovation, Product Preannouncements, and Predation", The American Economic Review, Dec. 1986, vol. 76, No. 5, pp. 940-955.
Garcia-Molina et al., "Database Systems: The Complete Book", Prentice Hall, Inc., Ch. 15, Oct. 1, 2001, pp. 713-715.
Grange, Frank, "Challenges in Modeling Demand for Inventory Optimization of Slow-Moving Items," Proceedings of the 1998 Winter Simulation Conference, 1998, pp. 1211-1217.
Greenlight.com Teams up With Credit Online to Expand Online Financing Options, Published in PR Newswire Association LLC; New York; Aug. 28, 2000 extracted from Dialog on Jun. 14, 2021, pp. 3.
Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.
Handfield et al., "Managing Component Life Cycles in Dynamic Technological Environments", International Journal of Purchasing and Materials Management, Tempe, Spring 1994, vol. 30, No. 2, pp. 20-28.
Inderfurth et al., "Decision Support for Spare Parts Acquisition in Post Product Life Cycle", Central European Journal of Operations Research, 2008, vol. 16, pp. 17-42.
"Intelligence Insight Impact", Polk Automotive Manufacturers; http://usa.polk.com/Industries/AutoMfr/Analyze/MarketAnalysis/, Dec. 13, 2007, pp. 3.
Invoicedealers.com, http://web.archive.org/web/20040804044511/http://www.invoicedealers.com/, Aug. 4, 2004, pp. 2.
Ivillage.com, http://web.archive.org/web/20040729234947/http://www.ivillage.com/, Jul. 29, 2004, pp. 2.
"Japan's JAAI System Appraises Used Cars Over Internet", Asia Pulse, Mar. 3, 2000, p. 1.
Jaro, Matthew A., "Probabilistic Linkage of Large Public Health Data Files", Statistics in Medicine, 1995, vol. 14, pp. 491-498.
Käki, Anssi, "Forecasting in End-of-Life Spare Parts Procurement", Master's Thesis, Helsinki University of Technology, System Analysis Laboratory, Jul. 27, 2007, pp. 84.
Kennedy et al., "An Overview of Recent Literature on Spare Parts Inventories", International Journal of Production Economics, 2002, vol. 76, pp. 201-215.
Kim et al., "Optimal Pricing, EOL (End of Life) Warranty, and Spare Parts Manufacturing Strategy Amid Product Transition", European Journal of Operation Research, 2008, vol. 188, pp. 723-745.
Koller, Mike, "Wireless Service Aids," InternetWeek, Jul. 9, 2001, p. 15.
Krupp, James A.G., "Forecasting for the Automotive Aftermarket", The Journal of Business Forecasting Methods & Systems, Winter 1993-1994, vol. 12, No. 4, ABI/Inform Global, pp. 8-12.
Lapide, Larry, "New Developments in Business Forecasting", The Journal of Business Forecasting, Spring 2002, pp. 12-14.
Lee, Ho Geun, "AUCNET: Electronic Intermediary for Used-Car Transactions", EM-Electronic Markets, Dec. 1997, vol. 7, No. 4, pp. 24-28.
Miller, Joe, "NADA Used-Car Prices Go Online", Automotive News, Jun. 14, 1999, p. 36.
Moore, John R., Jr. "Forecasting and Scheduling for Past-Model Replacement Parts", Management Science, Application Series, vol. 18, No. 4, Part 1, Dec. 1971, pp. B-200-B-213.
"NAAA—Recommended Vehicle Condition Grading Scale", Noted as early as 2007, pp. 3.
Packer, A. H., "Simulation and Adaptive Forecasting an Applied to Inventory Control", Operations Research, Jul. 1965, vol. 15, No. 4, pp. 660-679.
"Power Information Network: Power to Drive your Business", J.D. Power and Associates Power Information Network, http://www.powerinfonet.com/products/productDetail.asp?type=financialinstitutions, Dec. 13, 2007, pp. 2.
Peters, Peter-Paul, "A Spare Parts Configurator for the European Service Business" (Graduation Report), Honeywell, Industrial Service Logistic Center, Amsterdam, The Netherlands, Mar. 2000, pp. 80.
Porter, G. Zell, "An Economic Method for Evaluating Electronic Component Obsolescence Solutions", www.gidep.org/data/dmsms/library/zell.pdf, May 1998, pp. 1-9.
"Pricing Tool", vAuto Live Market View, http://www.avauto.com/vAuto_Solution/pricing.asp, Dec. 13, 2007, pp. 2.
Reinbach, Andrew, "MCIF Aids Banks in CRA Compliance", Bank Systems & Technology, Aug. 1995, vol. 32, No. 8, p. 27.
Roos, Gina, "Web-Based Service Helps OEMs Cure Parts Obsolescence Blues", Electronic Engineering Times, Oct. 8, 2001, p. 86.
Santarini, Michael, "Forecasts the Probable Obsolescence of Components—Module Predicts Parts Life", Electronic Engineering Times, Jan. 11, 1999, vol. 1, p. 48.
Sawyers, Arlena, "NADA to Offer Residual Guide", Automotive News, May 22, 2000, p. 1.
Shapiro et al., "Systems Competition and Aftermarkets: an Economic Analysis of Kodak", The Antitrust Bulletin, Spring 1994, pp. 135-162.
"Stoneage Corporation Announces Database of 250,000 Used Cars Posted to the Internet", PR Newswire, Feb. 24, 1998, p. 1.
Sullivan, Laurie, "Obsolete-Parts Program Thriving", EBN, Manhasset, NY, Jan. 21, 2002, Issue 1296, p. 26.
"Urban Science Launches Second Generation Lead Scoring Solution", Urban Science, Detroit, MI, Mar. 1, 2007, http://www.urbanscience.com/newsevents/pr_20070222.html, pp. 3.
"WashingtonPost.com and Cars.com Launch Comprehensive Automotive Web Site For the Washington Area", PR Newswire, Oct. 22, 1998. pp. 2.
Watts, Craig, "Consumers Now Can Know What Loan Rate Offers to Expect Based on Their FICO Credit Score at MyFICO.com," San Rafael, CA, Mar. 6, 2002, pp. 2, http://www.myfico.com/PressRoom/PressReleases/2002_03_06.aspx.
Webster, Lee R., "Failure Rates & Life-Cycle Costs", Consulting-Specifying Engineer, Apr. 1998, vol. 23, No. 4, ABI/INFORM Global, p. 42.
"Web Sites Let Automotive Consumers Arm Themselves with Price Information", Orange County Register, Nov. 14, 1997, pp. 3.
"Yahoo! Autos Provides Enhanced Road Map for Researching, Buying and Selling Cars Online", PR Newswire, Oct. 13, 1998, pp. 2.
International Search Report and Written Opinion in PCT Application No. PCT/US07/76152, dated Mar. 20, 2009.
"The Most Reliable Cars 2006", https://www.forbes.com/2006/04/20/reliable-vehicles-japanese_cx_dl_0424feat%20html?sh=19b3172a48f3, Apr. 24, 2006, pp. 4.

SYSTEMS AND METHODS FOR GENERATING DYNAMIC MODELS BASED ON TRIGGER EVENTS

PRIORITY CLAIM

This application is a continuation of U.S. patent application Ser. No. 16/246,083, filed Jan. 11, 2019, the entire contents of which is hereby incorporated by reference in its entirety herein and should be considered part of this specification.

TECHNICAL FIELD

Embodiments of the present disclosure relate to data processing, including database and file management, as well as a database system for accessing one or more databases or other data structures.

BACKGROUND

Electronic databases provide for storage and retrieval of digital data records. Data records in such databases may be electronically updated.

SUMMARY

The systems, methods, and devices described herein each have several aspects, no single one of which is solely responsible for its desirable attributes. Without limiting the scope of this disclosure, several non-limiting features will now be described briefly.

Embodiments of the present disclosure relate to a database system (also herein referred to as "the system") for merging data from discrete, and changing data sets and dynamically generating customized models based on the merged data.

In one embodiment, a data processing system for accessing databases and updated data items is disclosed. The data processing system comprises a client database including a plurality of client records relating to a plurality of vehicles associated with a plurality of clients, wherein each client record includes contact information for a client and information relating to at least one vehicle associated with the client, a hardware processor, and a communication circuit. The hardware processor is configured to execute computer-readable instructions to verify that each of the plurality of client records conforms to a set of formatting guidelines and apply a first data filter to each of the plurality of client records to generate a vehicle data subfile comprising records for each vehicle associated with one of the clients having a record in the client database and a second data filter to the plurality of client records to generate a client data subfile comprising information for each of the clients having a record in the client database. The hardware processor is further configured to execute computer-readable instructions to monitor the vehicle data subfile and the client data subfile for one or more trigger event records, wherein the one or more trigger event records identifies one or more of a vehicle event and a client event and generate one or more dynamic models for determining a likelihood that a client associated with the one or more trigger event records will perform a particular action, based on the one or more trigger events. The hardware processor is also configured to execute computer-readable instructions to apply the one or more dynamic models to generate at least one score value associated with the at least one trigger event record, wherein the at least one score value provides a value representative of the predicted likelihood that the client will perform the particular action and generate a notification including one or more of the generated at least one score value, the one or more trigger event records, and information associated with the one or more trigger event records. The communication circuit is configured to receive the plurality of client records from a user and transmit the notification to the user.

In another embodiment, a computer implemented method for generating an event notification is disclosed. The method comprises accessing, by a database system, a client database including a plurality of client records relating to a plurality of vehicles associated with a plurality of clients, wherein each client record includes contact information for a client and information relating to at least one vehicle associated with the client and verifying that each of the plurality of client records conforms to a set of formatting guidelines. The method also comprises applying a first data filter to each of the plurality of client records to generate a vehicle data subfile comprising records for each vehicle associated with one of the clients having a record in the client database and applying a second data filter to the plurality of client records to generate a client data subfile comprising information for each of the clients having a record in the client database. The method further comprises monitoring the vehicle data subfile and the client data subfile for one or more trigger event records, wherein the one or more trigger event records identifies one or more of a vehicle event and a client event and generating one or more dynamic models for determining a likelihood that a client associated with the one or more trigger event records will perform a particular action, based on the one or more trigger events. The method additionally comprises applying the one or more dynamic models to generate at least one score value associated with the at least one trigger event record, wherein the at least one score value provides a value representative of the predicted likelihood that the client will perform the particular action, generating a notification including one or more of the generated at least one score value, the one or more trigger event records, and information associated with the one or more trigger event records, and transmitting the notification to the user.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to perform operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, computer readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

BRIEF DESCRIPTION OF THE DRAWINGS

The above-mentioned aspects, as well as other features, aspects, and advantages of the present technology will now be described in connection with various aspects, with reference to the accompanying drawings. The illustrated aspects, however, are merely examples and are not intended to be limiting. Throughout the drawings, similar symbols typically identify similar components, unless context dictates otherwise. Note that the relative dimensions of the following figures may not be drawn to scale. The following drawings and the associated descriptions are provided to illustrate embodiments of the present disclosure and do not limit the scope of the claims. Moreover, the relative dimensions of the following figures may not be drawn to scale.

The figures depicted herein and the corresponding descriptions may utilize examples involving dealers, vehicles, and corresponding entities and items. However, these entities and items may be replaced with any saleable consumer good or item.

DETAILED DESCRIPTION

Figure 1:
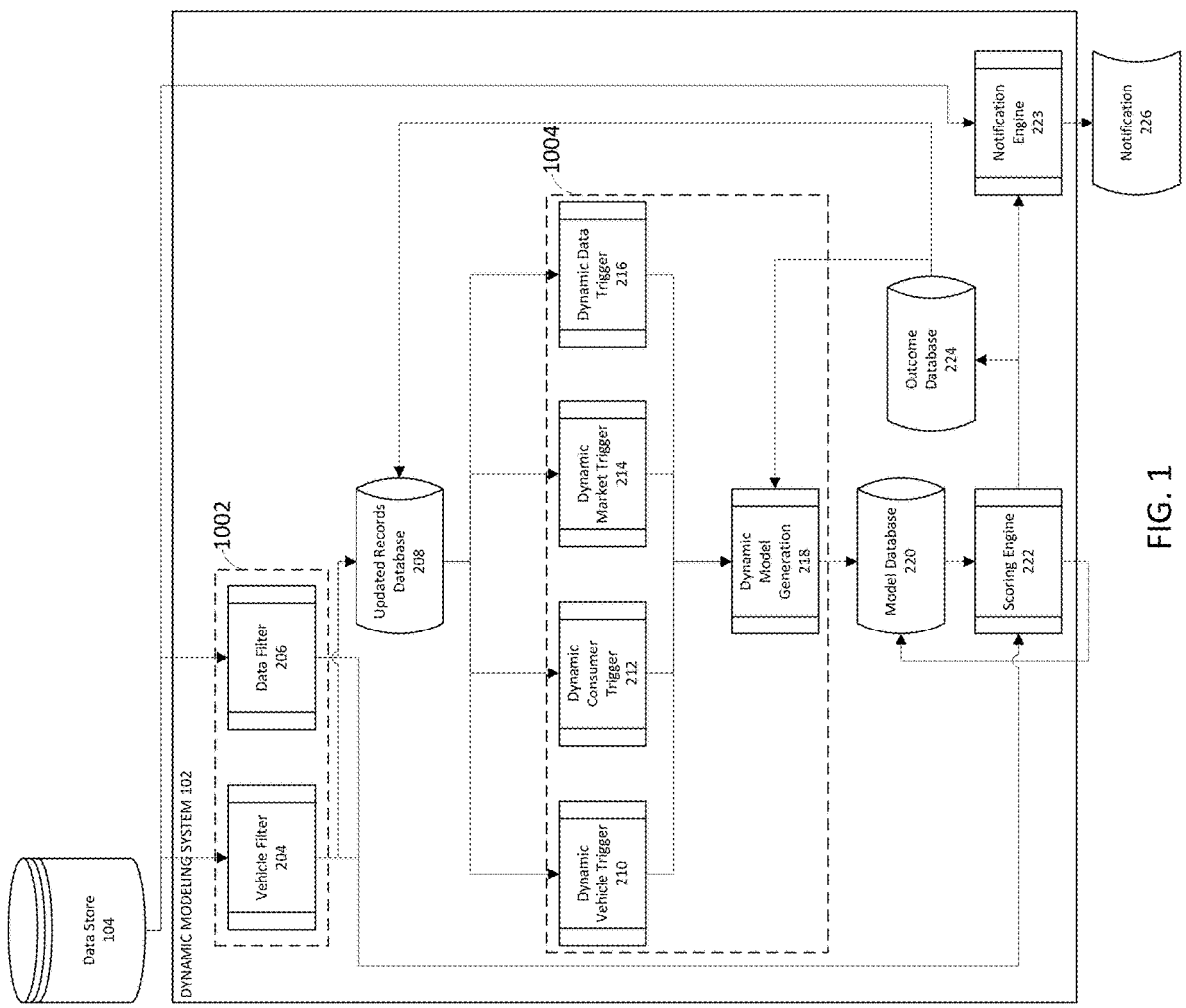
FIG. 1 is a block or data flow diagram of a database system for providing electronic notifications regarding database records, according to an embodiment.

Although certain embodiments and examples are disclosed below, inventive subject matter extends beyond the specifically disclosed embodiments to other alternative embodiments and/or uses and to modifications and equivalents thereof. Thus, the scope of the application is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

Embodiments of the present disclosure relate to an event-based customer loyalty measurement solution that gives requesting entities the ability to more effectively manage and strengthen retention efforts. With insights derived from the monitoring of both macro- and micro-environments relating to the vehicle, consumer events, and the overall automotive landscape, clients can quickly gain a deep understanding of consumer loyalty propensities and can create and execute initiatives that maximize their customer loyalty opportunities.

II. Terms

To facilitate an understanding of the systems and methods discussed herein, a number of terms are described below. The terms described below, as well as other terms used herein, should be construed broadly to include the described information, the ordinary and customary meaning of the terms, and/or any other implied meaning for the respective terms. Thus, the descriptions below do not limit the meaning of these terms, but only provide exemplary descriptions.

Data Store: Includes any computer readable storage medium and/or device (or collection of data storage mediums and/or devices). Examples of data stores include, but are not limited to, optical disks (for example, CD-ROM, DVD-ROM, and so forth), magnetic disks (for example, hard disks, floppy disks, and so forth), memory circuits (for example, solid state drives, random-access memory ("RAM"), and so forth), and/or the like. Another example of a data store is a hosted storage environment that includes a collection of physical data storage devices that may be remotely accessible and may be rapidly provisioned as needed (commonly referred to as "cloud" storage).

Database: Includes any data structure (and/or combinations of multiple data structures) for storing and/or organizing data, including, but not limited to, relational databases (for example, Oracle databases, MySQL databases, and so forth), non-relational databases (for example, NoSQL databases, and so forth), in-memory databases, spreadsheets, as comma separated values ("CSV") files, eXtendible markup language ("XML") files, TeXT ("TXT") files, flat files, spreadsheet files, and/or any other widely used or proprietary format for data storage. Databases are typically stored in one or more data stores. Accordingly, each database referred to herein (for example, in the description herein and/or the figures of the present application) is to be understood as being stored in one or more data stores.

Database Record and/or Record: Includes one or more related data items stored in a database. The one or more related data items making up a record may be related in the database by a common key value and/or common index value, for example.

Update Data Item and/or Update: Any data item that may be used to update a database record, in whole or in part. For example, an update data item may indicate that it is related to a corresponding database record. The system may compare the update data item to the corresponding database record, determine that the update data item indicates a change to one or more data items of the database record, and then update the database record as indicated by the update data item.

Event Notification, Notification, and/or Alert: Includes electronic any notification sent from one computer system to one or more other computing systems. For example, a notification may indicate a new record set or changes to one or more records of interest. Notifications may include information regarding the record change of interest, and may indicate, for example, to a user, an updated view of the data records. Notifications may be transmitted electronically, and may cause activation of one or more processes, as described herein.

User: depending on the context, may refer to a person, such as an individual, consumer, or customer, and/or may refer to an entity that provides input to the system and/or an entity that utilizes a device to receive the event notification, notification or alert (for example, a user who is interested in receiving notifications upon the occurrence of the newly generated record set or changes to records of interest). Thus, in the first context, the terms "user," "individual," "consumer," and "customer" should be interpreted to include single persons, as well as groups of users, such as, for example, married couples or domestic partners, organizations, groups, and business entities. Additionally, the terms may be used interchangeably. In some embodiments, the terms refer to a computing device of a user rather than, or in addition to, an actual human operator of the computing device.

A model generally refers to a machine learning construct which may be used by the transaction processing system to automatically generate recommendations. A model may be trained. Training a model generally refers to an automated machine learning process to generate the model that accepts transaction data as an input and provides a recommendation as an output. A model may be represented as a data structure that identifies, for a given value, one or more correlated values. For example, a transaction category recommendation data structure may include data indicating, for a candidate transaction category, one or more recommended transaction categories. In such implementations, the model may be indexed to provide efficient look up and retrieval of correlation values.

Machine learning generally refers to automated processes by which received data is analyzed to generate and/or update one or more models. Machine learning may include artificial intelligence such as neural networks, genetic algorithms, clustering, or the like. Machine learning may be performed using a training set of data. The training data may be used to generate the model that best characterizes a feature of interest using the training data. In some implementations, the class of features may be identified before training. In such instances, the model may be trained to provide outputs most closely resembling the target class of features. In some implementations, no prior knowledge may be available for training the data. In such instances, the model may discover new relationships for the provided training data. Such relationships may include similarities between data elements such as transactions or transaction categories as will be described in further detail below.

Requesting Entity generally refers to an entity, such as a business, a non-profit organization, an educational institution, an automobile dealer, a vehicle manufacture, a financial institution, etc., that request information and/or services from one or more of the systems discussed herein. For example, a requesting entity may comprise an automobile dealership that provides customer information for monitoring of events that may be indicative of opportunities to enhance relationships with particular customers, and the requesting entity may receive notifications of when such events occur so that appropriate action can be timely taken.

III. Example Operation of the System

FIG. 1 is one embodiment of a block or data flow diagram of a database system, referred to as a dynamic modeling system 102, for dynamically generating and/or updating models for processing data sourced from various databases and applying the models to generate notifications based on various outcomes of the models. In some implementations, one or more of the blocks of FIG. 1 may be optional, and/or blocks may be rearranged. The dynamic modeling system 102 may be used to generate dynamic models for scoring likelihood of particular outcomes based on identified events. Given input information, the dynamic modeling system 102 may identify various combinations of events (based on the input information) and generate dynamic models that predict specific outcomes. The dynamic modeling system 102 may subsequently apply these dynamic models to new input information from various clients to predict outcomes specific to the new input information, thereby allowing clients to identify potential outcomes and generate new leads based on the potential outcomes. Additionally, the new input information may provide additional data points that can be used to update the dynamic models. Further details are provided herein.

At a hygiene component 1002, the dynamic modeling system 102 may filter or otherwise analyze data received from a data store 104. In some embodiments, the filtering or analyzing of data at the hygiene component 1002 includes separating the data received from the data store 104 into a plurality of sets of records (in an example use case based on dealership client information, vehicle data and user data) via the filters 204 and 206. These filters may also determine whether any of the records from the data store 104 are applicable for generating or applying one or more scoring models. In some embodiments, the filters 204 and 206 determine whether the records received from the data store 104 include usable data (for example, in a correct format or conforming to a set of formatting guidelines, including particular information, particular fields, unique or expected identifiers, etc.) while separating the data into the subsets or subfiles of data records (for example, the vehicle data and the user data). In some embodiments, the filters 204 and 206 may delete or remove records that do not conform to expected formatting, etc., from the data store 104.

In some embodiments, in addition to determining whether the received records are usable, the hygiene component 1002 processes the data received from the data store 104 to ensure that the received data includes records in a recognizable or usable format and/or generates data for storage in an updated records database 208. The described functions for the hygiene component 1002 may apply regardless of whether the dynamic modeling system 102 is generating the dynamic models or applying/updating the dynamic models. The hygiene component 1002 and its filters 204 and 206 are described in further detail below, with reference to hygiene component 420 and vehicle and user data verification 422 and 424, respectively, of FIG. 4.

In some embodiments, the data store 104 stores information from a client, including details of consumers, such that the hygiene component 1002 ensures proper formatting and filtering of the information and performs other relevant analysis on subsets of the information. For example, using the example use case of client information from a dealership, data received from data store 104 includes information (for example, database records) regarding particular dealership clients who have purchased vehicles from or had vehicles serviced at the dealership. The file also includes details about the purchased or serviced vehicles. Further, the database records in the data store 104 each represent a person, and include the person's name, address, city, county, state, country, and/or zip code, and information regarding the person's vehicle(s), such as make, model, title status, mileage, etc. Further, the database records may each be associated with a unique identifier (for example, a key value and/or index value). The hygiene component 1002 and the vehicle and data filters 204 and 206 may ensure that the received records from the data store 104 are in an appropriate format and include necessary information and/or parameters for the dynamic modeling system 102 to perform the modeling and scoring described below.

Once the hygiene component 1002 and its filters have reviewed and/or analyzed the data received from the data store 104, the records that are determined to be usable for modeling and scoring are stored in the updated records database 208. In some embodiments, a modeling component 1004 may access the records stored in the updated records database 208 to monitor for one or more triggers. For example, the modeling component 1004 includes one or more modules that detects an event associated with the records stored in the updated records database 208. For example, in the use case of the dealership client information, the modeling component 1004 identifies vehicle events (for example, via the dynamic vehicle trigger 210), consumer events (for example, via the dynamic consumer trigger 212), market events (for example, via the dynamic market trigger 214), and other data events (for example, via the dynamic data trigger 216). For example, the dynamic vehicle trigger 210 monitors the records in the updated records database 208 to identify any events that pertain to vehicles. Similarly, the dynamic consumer trigger 212 may monitor the records in the updated records database 208 to identify any events that pertain to vehicle owners, the dynamic market trigger 214 may monitor the records in the updated records database 208 to identify any events that pertain to the industry in question, and the dynamic data trigger 216 may monitor the records in the updated records database 208 to identify any events that relate to data associated with the vehicle or user in question. In some embodiments, the updated records database 208 may be shared with or may be the same as the data store 104. In some embodiments, the updated records database 208 is updated based on the records in an outcome database 224, which may include score or other additional information. For example, in the use case of dealership client information described above, the dealership client records in the updated records database 208 may be appended to include scores (for example, propensity scores) or score related information relevant to those records.

Each of the triggers 210-216 may cause a model to be dynamically generated by the dynamic model generation block 218. Accordingly, the dynamic model generation block 218 may generate a model based on detecting one or more events via a respective one or more of the triggers 210-216. For example, in the example use case of client data from a dealership, the modeling component 1004 may determine, via the dynamic vehicle trigger 210, that one of the dealership's clients experienced a vehicle event. Based on this determination, the dynamic model generation block 218 may generate a model that predicts or estimates whether or not, or a likelihood that, the one dealership client will purchase or acquire a new vehicle based on the experienced vehicle event. Similarly, the dynamic model generation block 218 may generate a model that predicts or estimates whether or not, or a likelihood that, the one dealership client will purchase or acquire a new vehicle based on an experienced consumer event, market event, or data event (via the dynamic consumer trigger 212, the dynamic market trigger 214, and the dynamic data trigger 216, respectively). In some embodiments, the models generated by the dynamic model generation block 218 are stored in a model database 220. In some embodiments, the dynamic model generation block 218 may generate a new model or update an existing model. Furthermore, the dynamic model generation block 218 may utilize information from an outcome database to update existing models or for use in generating new models. For example, in the use case of client data from the dealership, the dynamic model generation block 218 may update an existing model or generate a new model based on triggers from the dealership client information and an input received from the outcome database 224 from processing the dealership client information and records. For example, outcome data, which may comprise score information and/or other information, as described in more detail below with reference to FIG. 5, may be used to update model generation. By incorporating the score information with the dynamic model generation 218, the dynamic model generation block 218 may account for existing or previous scores in the models being generated and/or updated, for example using machine learning techniques.

In some embodiments, the model database 220 includes models that are updated and/or generated by the dynamic model generation block 218, which are stored in the model database 220. In some embodiments, the model database 220 may receive inputs from the scoring engine 222, by which the models stored in the model database 220 can be updated and/or appended with score information. For example, using the use case of the dealership client information, models stored in the model database 220 may be appended and/or updated based on scores of previously processed and/or currently processed client information. For example, where a particular client record has a high score based on a model in the model database 220, that same model may be appended with the high score information to inform that other records processed by that model or a similar model may have a higher likelihood of also having a high score.

The scoring engine 222 may generate one or more scores pertaining to the records from the data store 104 for which one or more models have been generated and/or updated. For example, using the example use case above, the dealership client information may be assigned a score, via the scoring engine 222 and based on the models in the model database 220, indicating a likelihood of buying or acquiring a new vehicle following a triggered event or a propensity or loyalty score. Additional details regarding the scoring processing is provided below with reference to FIG. 5.

In some embodiments, the scoring engine 222 may be applied to user records identified as being of interest, for example when, in the use case above, the dealership client information includes updated new customers and/or potential customers, such that the new records are analyzed based on existing models to determine if sufficient information exists to assign scores to those records.

The scoring engine may store its outcome data (for example, generated score values, etc.) in an outcome database 224. In some embodiments, the outcome data may be provided to one or more of the updated records database 208 and/or the dynamic model generation block 218. For example, in the use case identified above, scores corresponding to individual client records in the dealership client information from the data store 104 may be stored in the outcome database 224. In some embodiments, these scores may then be provided to the updated records database 208 (for example, appending the client records to include the score or outcome information) and/or the dynamic model generation block 218 (for example, to include in generating and/or modifying models).

The notification engine 223 may receive the score information (and any corresponding client information) and may generate and transmit a notification to the client or other entity or user. For example, in the example use case of dealership client information, the notification engine 223 may generate the notification 226 for transmission to the dealership. The notification 226 as generated by the notification engine 223 may include details of one or more particular clients based on the initial client information from the dealership as well as score information (as generated by the scoring engine 222). In some embodiments, the notification 226 may provide the dealership with a simplified interface by which the dealership may track notifications generated by the dynamic modeling system 102, as discussed in additional detail below with regard to FIG. 7.

Alternatively, the notification 226 may be generated as an output file on a periodic basis, for example daily, weekly, monthly, bimonthly, quarterly, semiannually, and so forth) and send a notification alert or notification package. The generated notification (for example, a package or alert) may comprise a digital and/or electronic message, for example as shown in relation to FIG. 7. The notification may include an indication of the corresponding records along with corresponding scores, and any other data items from the corresponding record (such as contact information). In other embodiments, the notification may be an indication to the user that user should access the dynamic modeling system 102 to review the records and/or the scores.

In some embodiments, the notification 226 is automatically transmitted to a device operated by the user associated with the data store 104, for example the dealership associated with the client information. The notification 226 can be transmitted at the time that the notification 226 is generated or at some determined time after generation of the notification 226. When received by the device, the notification 226 can cause the device to display the notification 226 via the activation of an application on the device (for example, a browser, a mobile application, and so forth). For example, receipt of the notification 226 may automatically activate an application on the device, such as a messaging application (for example, SMS or MMS messaging application), a standalone application (for example, a vehicle dealership application or vehicle financing application used by a financial agency), or a browser, for example, and display information included in the notification 226. Alternatively, the notification 226 may include a URL of a webpage (or other online information), such that when the device (for example, a mobile device) receives the notification 226, a browser (or other application) is automatically activated and the URL included in the notification 226 is accessed via the Internet.

IV. Additional Example Implementations of the System

Figure 2:
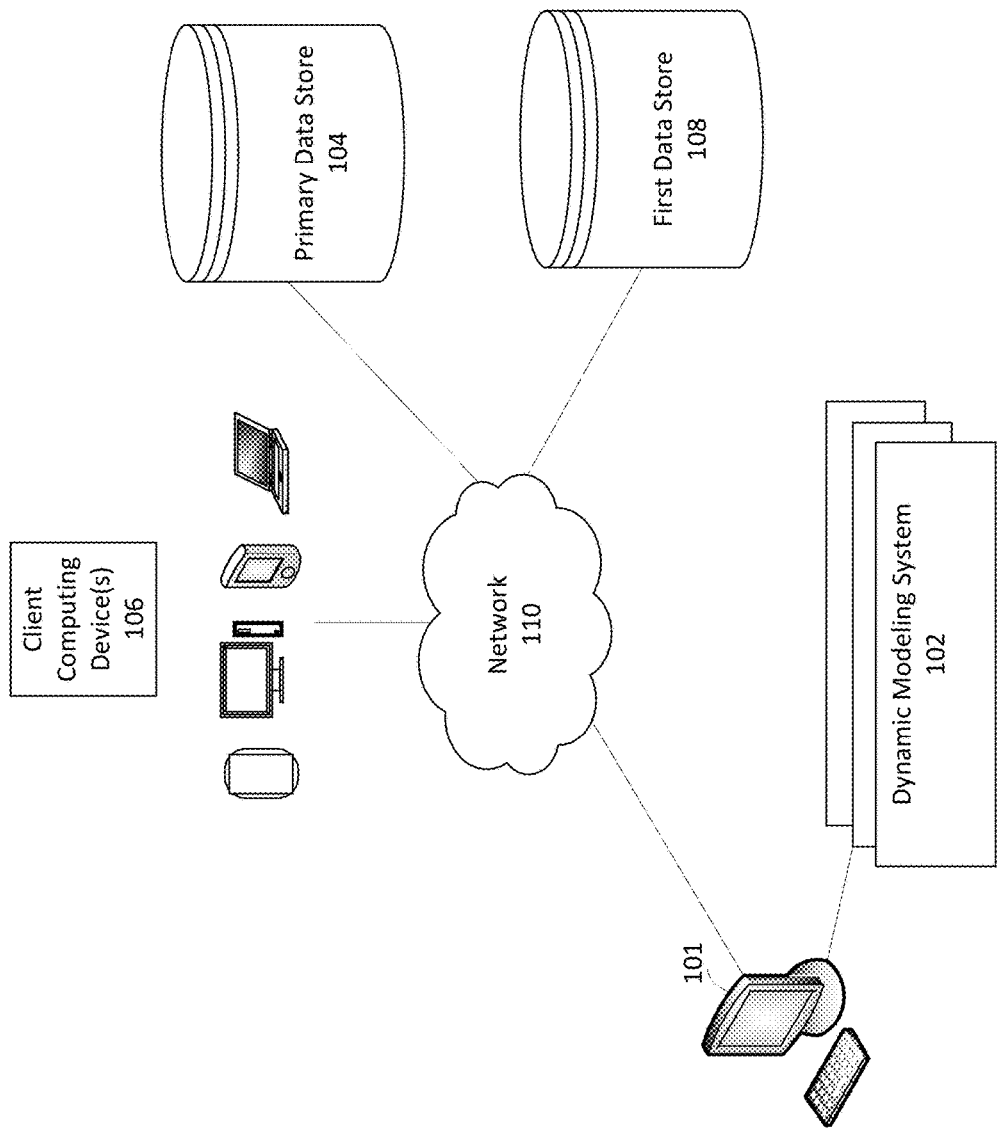
FIG. 2 illustrates one possible organization of a system that can dynamically generate models for identifying conditions based on information from a plurality of databases, in accordance with an exemplary embodiment.
Figure 3:
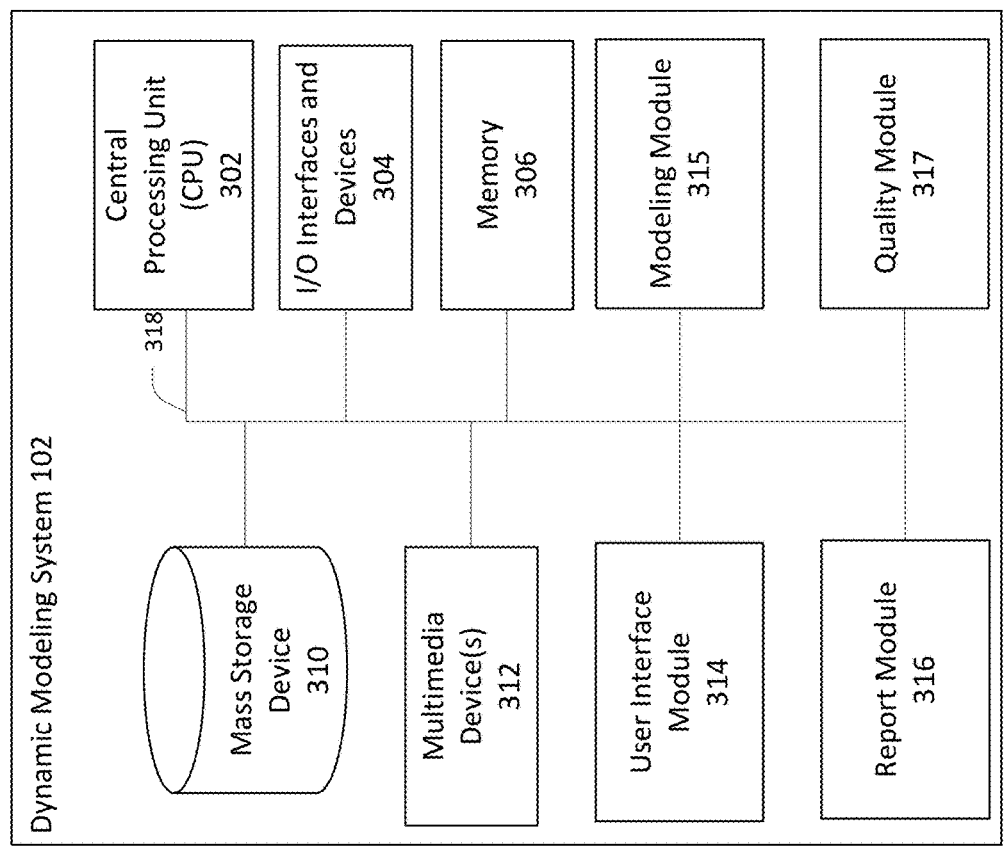
FIG. 3 is a block diagram corresponding to an aspect of a hardware and/or software component of an example embodiment of a device in the system of FIG. 2.

FIGS. 2 and 3 illustrate embodiments of a dynamic modelling system 102 used to communicate with data stores in a system 100.

a. System Overview

FIG. 2 illustrates one embodiment of a system 100 that allows users to dynamically generate models for processing data sourced from various databases where the models can generate outputs (for example, reports, segments, and so forth) from the data based on dynamically changing requirements from users.

The system 100 of FIG. 2 comprises a dynamic modeling system 102 interfacing with a computing device 101, a first data store 104, a second data store 108, additional computing devices 106, and a network 110. Additionally, communication links are shown enabling communication among the components of system 100 via the network 110. The computing device 101 is shown communicatively coupled to the dynamic modeling system 102 in a localized manner (for example, via a local communication link), though the dynamic modeling system 102 may be integrated into the computing device 101 or vice versa, or may be accessible via the network 110. Furthermore, in some embodiments, one or more of the data stores described herein may be combined into a single data store that is local to the computing device 101 or remote from the computing device 101 or additional data stores not show may be integrated with the system 100. In some embodiments, two or more of the components described above may be integrated. In some embodiments, one or more of the components may be excluded from the system 100 or one or more components not shown in FIG. 1 may be included in the system 100. The system 100 may be used to implement systems and methods described herein.

In some embodiments, the network 110 may comprise any wired or wireless communication network by which data and/or information may be communicated between multiple electronic and/or computing devices. The wireless or wired communication network may be used to interconnect nearby devices or systems together, employing widely used networking protocols. The various aspects described herein may apply to any communication standard, such as a wireless 802.11 protocol. The computing device 101 may comprise any computing device configured to transmit and receive data and information via the network 110 for an entity. The entity may be an individual person, or an institution such as a business, a non-profit organization, an educational institution, an automobile dealer, a vehicle manufacture, a financial institution, and so forth. In some embodiments, the computing device 101 may include or have access to one or more databases (for example, the first data store 104 and the second data store 108) that include various records and information that may be used to generate customized outputs. In some embodiments, the computing device 101 may be accessible locally as well as remotely via the network 110. The computing device 101 may create the customized outputs based on events associated with potential clients (for example, historical data, vehicle, or life events described herein). These events (and corresponding information) may be used to dynamically generate models for when to predictively engage potential clients to provide better value to the potential client and improve likelihood of completing a transaction with the potential client.

The first data store 104 may comprise one or more databases or data stores and may also store data regarding any of the historical or current events. Using the example use case, the first data store 104 may comprising marketing data which includes name, contact information, zip code, as well as other demographic data and potentially other data items for a consumer. In some embodiments, the marketing database may provide data for households or consumers within particular geographic areas, as defined by the users via the one or more computing devices 106 or the computing device 101. For example, the marketing database may provide details regarding households in a geographic area defined by a zip code or zip code+4 identifier (sometimes referred to as a zip 9).

The computing devices 101, 106 may comprise any computing device configured to transmit and receive data and information via the network 110. In some embodiments, the computing device 106 may be configured to perform analysis of the transmitted and received data and information and/or perform one or more actions based on the performed analysis and/or the transmitted and received data and information. In some embodiments, the one or more computing devices 101, 106 may comprise mobile or stationary computing devices. In some embodiments, the computing device 101, 106 may be integrated into a single terminal or device. In some embodiments, when the computing device 101 is remote from the dealer, manufacturer, or other entity, the computing devices 106 may be used by users to access the network 110 and access the computing device 101 remotely.

The second data store 108 may also comprise one or more databases or data stores and may also store data regarding any of the historical or current events. In the example use case, the second data store 108 comprise a vehicle history database or other financial information source that may provide lease data, such as vehicle lease data, loan data, equity data, event data, etc., which indicates, by zip code or other geographic criteria, the number of households coming off lease, off loan, having equity, or experiencing events on specific dates or in time frames. For example, the lease, loan, equity, or event data may be organized based on or according to one or more of a vehicle's unique identifier (for example, a vehicle identification number, a license plate number, and so forth), personal information for an owner or lessee, and so forth. The lease data store may comprise records associated with the lease or ownership of vehicles included therein and may comprise records from state agency records, independent agency records, financial institutions, dealers and/or manufacturers, and the like. In some embodiments, the lease data store may comprise publicly available and/or "private sources. In some embodiments, the lease data store may provide a lease file that includes details regarding leases that are terminating or ending within a certain period of time. Alternatively, or additionally, the lease data store may provide a loan maturity or similar financing file that includes details of loans or other financing tools that are terminating or ending within the period of time.

The dynamic modeling system 102 may process data from the first data store 104 and the second data store 108 and also generate one or more models based on requests or inputs provided by users via the computing devices 106 and the computing device 101. The dynamic modeling system 102 may dynamically generate one or more models that are applied to data obtained from one or more of the first data store 104, the second data store 108, or the users (via the one or more computing devices 106). In some embodiments, the models may be generated dynamically by the dynamic modeling system 102 as the inputs and data change. For example, the dynamic modeling system 102 may generate changing models in real-time based on the inputs received from the user (for example, types of vehicles selected by the user for inclusion in generating the outputs, geography, time frames, and so forth). In some embodiments, the generated models themselves may be dynamically applied to the inputs and data. For example, the models generated by the dynamic modeling system 102 may create various metrics and data points based on the data sourced from the first and second data stores 104 and 108, respectively, and the users (for example, filters, geographic areas, and so forth). The models generated by the dynamic modeling system 102 may also be used to dynamically apply various rules or constraints to the generated and obtained data. For example, the models may dynamically apply one or more rules to confirm that the outputs being generated do not violate any predetermined requirements or standards on data mining, storage, and so forth. In some embodiments, the development of the model comprises identifying marketing characteristics, attributes, or segmentations that are statistically correlated (for example, a statistically significant correlation) with being more likely to meet a specific criteria. In some embodiments, the development of the model may include developing a set of heuristic rules, filters, and/or electronic data screens to determine and/or identify and/or predict which consumers would be considered more likely to be meet specific criteria based on current and/or historical data. In some embodiments, the dynamic modeling system 102 may automatically adjust the model to meet pre-selected levels of accuracy and/or efficiency.

In some embodiments, the dynamic modeling system 102 may be adaptive to data from the first data store 104, the second data store 108, or from users that is constantly changing. For example, the inputs received from the user (for example, via the user interface module 314 or the I/O interfaces and devices 304 in FIG. 3) may be different for each user. Using an example use case, one user may be interested in a first set of zip codes along with Honda vehicles, whereas another user may be interested in a different set of zip codes along with BMW vehicles, whereas a third user may be interested in the same set of zip codes as the first user, but with Mercedes vehicles instead of Honda vehicles. Accordingly, the data obtained from the first and second data stores 104 and 108 using the filter criteria from the users, will likely be constantly changing. Thus, the processing and/or model generation will change for each user. Additionally, the data obtained from the first and second data stores 104 and 108 will likely change over time as records in the data stores are updated, replaced, and/or deleted. In the example use case, different users may request different periods of time, different vehicle makes, types, models, and so forth, different customers, and different geographic areas such that the lease and customer data stores are changing. Accordingly, the dynamic modeling system 102 may dynamically generate models to handle constantly changing data and requests.

Based on the user requests, as will be detailed herein, the data obtained from the first and second data stores 104 and 108, respectively, may be filtered to eliminate those records that are not desired. For example, in the example use case, records may be filtered to eliminate non-competitive vehicle makes, types, and so forth. However, while such filtering may reduce processing complexities, the reduced information also results in reduced efficiencies and accuracies, for example for a certain time period. Accordingly, the dynamic modeling system 102 and the dynamic models may balance when to apply filters to confirm the greatest accuracy in results while reducing unnecessary data processing.

In various embodiments, large amounts of data are automatically and dynamically calculated interactively in response to user inputs, and the calculated data is efficiently and compactly presented to a user by the system. Thus, in some embodiments, the data processing and generating of user interfaces described herein are more efficient as compared to previous data processing and user interfaces generation in which data and models are not dynamically updated and compactly and efficiently presented to the user in response to interactive inputs.

Further, as described herein, the system may be configured and/or designed to generate output data and/or information useable for rendering the various interactive user interfaces or reports as described. The output data may be used by the system, and/or another computer system, device, and/or software program (for example, a browser program), to render the interactive user interfaces or reports. The interactive user interfaces or reports may be displayed on, for example, electronic displays (including, for example, touch-enabled displays).

The various embodiments of interactive and dynamic data processing and output generation of the present disclosure are the result of significant research, development, improvement, iteration, and testing. This non-trivial development has resulted in the modeling and output generation described herein, which may provide significant efficiencies and advantages over previous systems. The interactive and dynamic modeling, user interfaces, and output generation include improved human-computer and computer-computer interactions that may provide reduced workloads, improved predictive analysis, and/or the like, for a user. For example, output generation via the interactive user interfaces described herein may provide an optimized display of time-varying report-related information and may enable a user to more quickly access, navigate, assess, and digest such information than previous systems.

In some embodiments, output data or reports may be presented in graphical representations, such as visual representations, such as charts, spreadsheets, and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, for example, forecast, future developments.

Further, the models, data processing, and interactive and dynamic user interfaces described herein are enabled by innovations in efficient data processing, modeling, interactions between the user interfaces, and underlying systems and components. For example, disclosed herein are improved methods of receiving user inputs, translation and delivery of those inputs to various system components, automatic and dynamic execution of complex processes in response to the input delivery, automatic data acquisition, automatic interaction among various components and processes of the system, and automatic and dynamic report generation and updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, for example, in memory databases) is limited in various ways (for example, manual data review is slow, costly, and less detailed; data is too voluminous; and so forth), and various embodiments of the disclosure provide significant improvements over such technology. Additionally, various embodiments of the present disclosure are inextricably tied to computer technology. In particular, various embodiments rely on detection of user inputs via graphical user interfaces, acquisition of data based on those inputs, modeling of data to generate dynamic outputs based on those user inputs, automatic processing of related electronic data, and presentation of output information via interactive graphical user interfaces or reports. Such features and others (for example, processing and analysis of large amounts of electronic data) are intimately tied to, and enabled by, computer technology, and would not exist except for computer technology. For example, the interactions with data sources and displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

b. Dynamic Modeling System

FIG. 3 is a block diagram corresponding to an aspect of a hardware and/or software component of an example embodiment of a dynamic modeling system 102 in the system 100 of FIG. 2. The hardware and/or software components, as discussed below with reference to the dynamic modeling system 102 may be also included in any of the devices of the system 100 (for example, the computing device 101, the computing devices 106, and so forth). These various depicted components may be used to implement the systems and methods described herein.

In some embodiments, certain modules described below, such as the modeling module 315, a user interface module 314, or a report module 316 included with the dynamic modeling system 102 may be included with, performed by, or distributed among different and/or multiple devices of the system 100. For example, certain user interface functionality described herein may be performed by the user interface module 314 of various devices such as the computing device 101 and/or the one or more computing devices 106.

In some embodiments, the various modules described herein may be implemented by either hardware or software. In an embodiment, various software modules included in the dynamic modeling system 102 may be stored on a component of the dynamic modeling system 102 itself (for example, a local memory 306 or a mass storage device 310), or on computer readable storage media or other component separate from the dynamic modeling system 102 and in communication with the dynamic modeling system 102 via the network 110 or other appropriate means.

The dynamic modeling system 102 may comprise, for example, a computer that is IBM, Macintosh, or Linux/Unix compatible or a server or workstation or a mobile computing device operating on any corresponding operating system. In some embodiments, the dynamic modeling system 102 interfaces with a smart phone, a personal digital assistant, a kiosk, a tablet, a smart watch, a car console, or a media player. In some embodiments, the dynamic modeling system 102 may comprise more than one of these devices. In some embodiments, the dynamic modeling system 102 includes one or more central processing units ("CPUs" or processors) 302, I/O interfaces and devices 304, memory 306, the dynamic modeling module 315, a mass storage device 310, a multimedia device 312, the user interface module 314, a report module 316, a quality module 317, and a bus 318.

The CPU 302 may control operation of the dynamic modeling system 102. The CPU 302 may also be referred to as a processor. The processor 302 may comprise or be a component of a processing system implemented with one or more processors. The one or more processors may be implemented with any combination of general-purpose microprocessors, microcontrollers, digital signal processors ("DSPs"), field programmable gate array ("FPGAs"), programmable logic devices ("PLDs"), controllers, state machines, gated logic, discrete hardware components, dedicated hardware finite state machines, or any other suitable entities that can perform calculations or other manipulations of information.

The I/O interface 304 may comprise a keypad, a microphone, a touchpad, a speaker, and/or a display, or any other commonly available input/output ("I/O") devices and interfaces. The I/O interface 304 may include any element or component that conveys information to the user of the dynamic modeling system 102 (for example, a requesting dealer, manufacturer, or other entity) and/or receives input from the user. In one embodiment, the I/O interface 304 includes one or more display devices, such as a monitor, that allows the visual presentation of data to the consumer. More particularly, the display device provides for the presentation of GUIs, application software data, websites, web apps, and multimedia presentations, for example.

In some embodiments, the I/O interface 304 may provide a communication interface to various external devices. For example, the dynamic modeling system 102 is electronically coupled to the network 110 (FIG. 2), which comprises one or more of a LAN, WAN, and/or the Internet. Accordingly, the I/O interface 304 includes an interface allowing for communication with the network 110, for example, via a wired communication port, a wireless communication port, or combination thereof. The network 110 may allow various computing devices and/or other electronic devices to communicate with each other via wired or wireless communication links.

The memory 306, which includes one or both of read-only memory (ROM) and random access memory ("RAM"), may provide instructions and data to the processor 302. For example, data received via inputs received by one or more components of the dynamic modeling system 102 may be stored in the memory 306. A portion of the memory 306 may also include non-volatile random access memory ("NVRAM"). The processor 302 typically performs logical and arithmetic operations based on program instructions stored within the memory 306. The instructions in the memory 306 may be executable to implement the methods described herein. In some embodiments, the memory 306 may be configured as a database and may store information that is received via the user interface module 314 or the I/O interfaces and devices 304.

The dynamic modeling system 102 may also include the mass storage device 310 for storing software or information (for example, the generated models or data obtained to which the models are applied, and so forth. Software shall be construed broadly to mean any type of instructions, whether referred to as software, firmware, middleware, microcode, hardware description language, or otherwise. Instructions may include code (for example, in source code format, binary code format, executable code format, or any other suitable format of code). The instructions, when executed by the one or more processors, cause the processing system to perform the various functions described herein. Accordingly, the dynamic modeling system 102 may include, for example, hardware, firmware, and software, or any combination therein. The mass storage device 310 may comprise a hard drive, diskette, solid state drive, or optical media storage device. In some embodiments, the mass storage device may be structured such that the data stored therein is easily manipulated and parsed.

As shown in FIG. 3, the dynamic modeling system 102 includes the modeling module 315. As described herein, the modeling module 315 may dynamically generate one or more models for processing data obtained from the data stores or the user. In some embodiments, the modeling module 315 may also apply the generated models to the data. In some embodiments, the one or more models may be stored in the mass storage device 310 or the memory 306. In some embodiments, the modeling module 315 may be stored in the mass storage device 310 or the memory 306 as executable software code that is executed by the processor 302. This, and other modules in the dynamic modeling system 102, may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 3, the dynamic modeling system 102 is configured to execute the modeling module 315 to perform the various methods and/or processes as described herein.

In some embodiments, the report module 316 may be configured to generate a report, notification, or output mentioned and further described herein. In some embodiments, the report module 316 may utilize information received from the dynamic modeling system 102, the data acquired from the data stores, and/or the computing device 101 or the user of the computing device 106 or the computing device 101 of FIG. 2 to generate the report, notification, or output for a specific dealer, manufacturer, or other entity. For example, the dynamic modeling system 102 may receive information that the dealer, manufacturer, or entity provides via the network 110 that the dynamic modeling system 102 uses to acquire information from the data stores and generate models for processing of the information. In some embodiments, the generated report, notification, or output may comprise a data file including names, addresses, contact information, and other pertinent financial information for potential clients expected to come off lease within a defined period of time. In some embodiments, the generated report, notification, or output may include a ranking or similar value for each potential client in the report or output, where the ranking or similar value corresponds to a confidence level that the corresponding potential client will be coming off lease during the defined period. In some embodiments, the report module 316 may include information received from the user in the generated report, notification, or output.

In some embodiments, the quality module 317 may verify a quality of the records or data included in the generated report or output. In some embodiments, the verification of the quality of record or data as performed by the quality module 317 may comprise identifying the ranking or corresponding value for each potential customer or records with a selected geographic group included in the generated report or output.

The dynamic modeling system 102 also includes the user interface module 314. In some embodiments, the user interface module 314 may also be stored in the mass storage device 310 as executable software code that is executed by the processor 302. In the embodiment shown in FIG. 3, the dynamic modeling system 102 may be configured to execute the user interface module 314 to perform the various methods and/or processes as described herein.

The user interface module 314 may be configured to generate and/or operate user interfaces of various types. In some embodiments, the user interface module 314 constructs pages, applications or displays to be displayed in a web browser or computer/mobile application. In some embodiments, the user interface module 314 may provide an application or similar module for download and operation on the computing device 101 and/or the computing devices 106, through which the user may interface with the dynamic modeling system 102 to obtain the desired report or output. The pages or displays may, in some embodiments, be specific to a type of device, such as a mobile device or a desktop web browser, to maximize usability for the particular device. In some embodiments, the user interface module 314 may also interact with a client-side application, such as a mobile phone application, a standalone desktop application, or user communication accounts (for example, e-mail, SMS messaging, and so forth) and provide data as necessary to display vehicle equity and prequalification determinations.

For example, as described herein, the dynamic modeling system 102 may be accessible to the dealer, manufacturer, or entity via a website, which may include a banner ad or widget for hyper targeting and/or identification of potential clients within a geographic region that likely has a large percentage of consumers coming off lease within a particular time period. In some embodiments, the user may select or opt out of receiving any report or output.

Once the dynamic modeling system 102 receives the user inputs (for example, identified vehicle type, lease end period, and so forth), the user may view the received information via the I/O interfaces and devices 304 and/or the user interface module 314. Once the dynamic modeling system 102 receives the information from the data stores (for example, via the I/O interfaces and devices 304 or via the user interface module 314), the processor 302 or the modeling module 315 may store the received inputs and information in the memory 306 and/or the mass storage device 310. In some embodiments, the received information from the data stores may be parsed and/or manipulated by the processor 302 or the dynamic modeling system 102 (for example, filtered or similarly processed).

In some embodiments, the processor 302 or the modules 316 or 317, for example, may be configured to generate ratings or levels (for example, a numerical rating or level) for models generated by the modeling module 315. In some embodiments, the ratings or levels may correspond to a confidence level in the accuracy of the modeling or other data processing. For example, the rating or level may provide a relative ranking of a specific model or data versus other models or data. In some embodiments, the rating or level may provide an absolute rating or level. In some embodiments, when a rating or level of a model or data is higher than that of other models or data, the model or data with the higher rating has a higher confidence of being accurate.

The various components of the dynamic modeling system 102 may be coupled together by a bus system 318. The bus system 318 may include a data bus, for example, as well as a power bus, a control signal bus, and a status signal bus in addition to the data bus. In different embodiments, the bus could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of the dynamic modeling system 102 may be combined into fewer components and modules or further separated into additional components and modules than that shown in FIG. 3.

V. Example Model Generation

Figure 4:
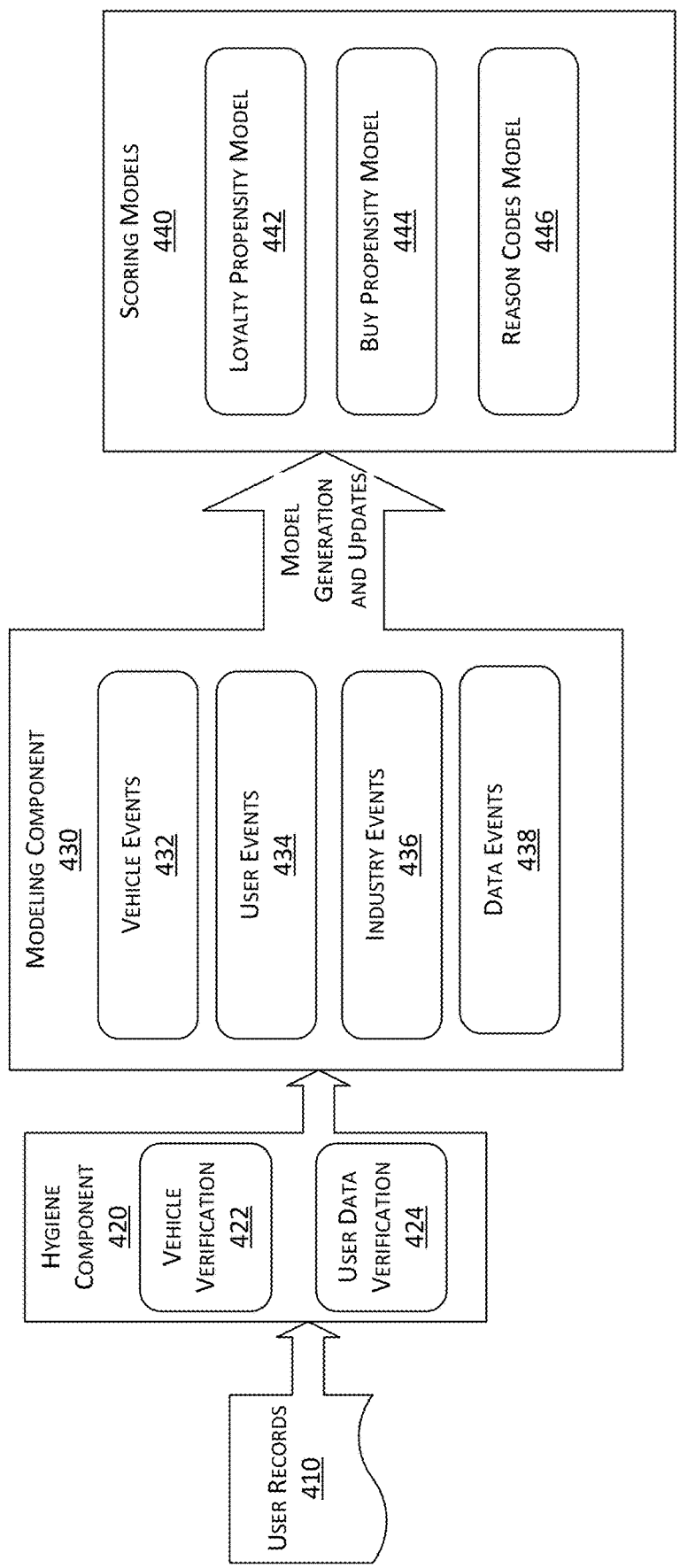
FIG. 4 is a block diagram illustrating components of a dynamic modeling system that may be used to generate models for scoring various aspects of a user record, such as a record of information that a dealership maintains for a particular customer in a CRM or other customer database.
Figure 7:
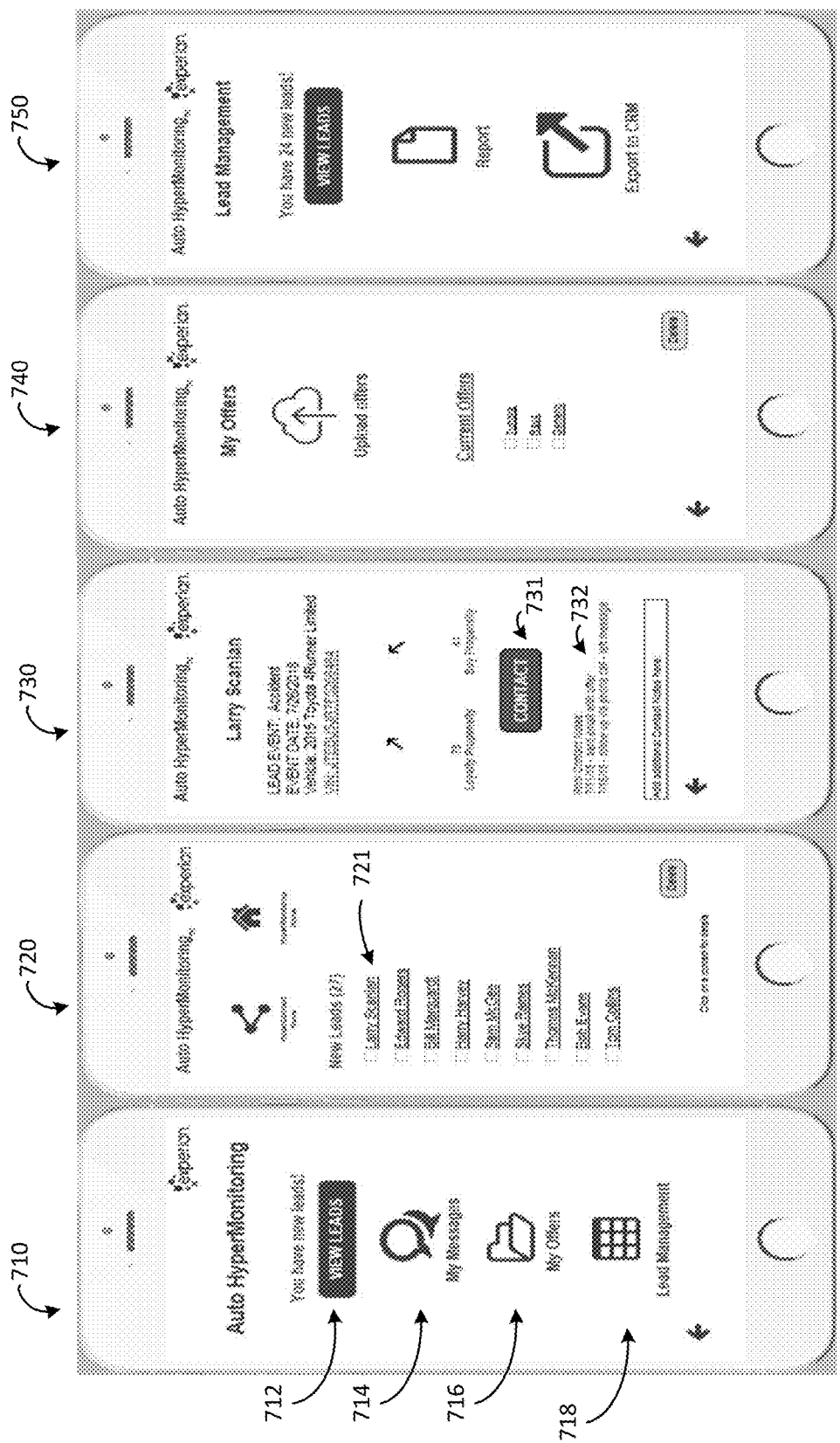
FIG. 7 illustrates several example user interfaces that are delivered to a mobile device of a requesting entity to provide information regarding a recently scored user profile.

FIG. 4 is a block diagram illustrating components of a dynamic modeling system that may be used to generate models for scoring various aspects of a user record, such as a record of information that a dealership maintains for a particular customer in a CRM or other customer database. In some embodiments, the hygiene component 420, modeling component 430, and scoring models 440 may be embodied in the dynamic modeling system 102 discussed elsewhere herein. In other embodiments, these components may be included in a different computing system and/or distributed between multiple computing systems. In the environment of FIG. 4, the modeling component 430 generates one or more scoring models 440, which may then be used by a scoring component 550 (FIG. 5) to develop scores for users (e.g., prior, current, and/or potential customers) associated with a requesting entity (e.g., a dealership) that may trigger alerts for actions by the requesting entity to maintain, improve, and/or establish a new relationship with the users. FIG. 7, discussed further below, provides several example user interfaces that may be provided in response to such triggers.

In the embodiment of FIG. 4, hygiene component 420 is configured to analyze user records, such as user records associated with an automobile dealership (or other entity), to determine if there are user records suitable for use in development of one or more scoring models. In one embodiment, the hygiene component 420 comprises a vehicle verification component 422 and user data verification component 424. The hygiene component 420 may perform format processing, updating, and/or determine that a minimum set of data is included in a user record, while the user data verification component 424 may determine accuracy of one, some, or all elements of user records, such as by comparing to other internal and/or external consumer databases. For example, vehicle history information databases (e.g., indicating title changes, accidents associated with a vehicle, extent of damage from accidents, etc.), garage loyalty databases (e.g., indicating ownership of a vehicle, length of ownership, historical ownership information, etc.), vehicle equity databases (e.g., lease or loan information, equity status, etc.), service databases (e.g., indicating service locations, frequency, repairs and services provided, etc.), and the like may be accessed to identify vehicle events. The data verification component 424 may perform standardization of items in the data records, such as to update user records from various sources to be in a common format. Data verification may also include other updates to vehicle data items, such as standardization of a user's address, name, and/or other data items.

For example, starting with a requesting entity's user records (e.g., database records of customers from one or more databases of an automobile dealership), vehicle information in the user records is checked for accuracy, completeness, and/or whether the user records should be used in developing scoring models. In some embodiments, only user records with vehicle identification numbers (VINs) that match the user's household information are usable in developing scoring models. For example, a database storing information associating households with vehicles, including VINs of those vehicles, may be accessed and compared to vehicle information in the user records to verify that the vehicle is associated with the user identified in the user record.

The user records may include information regarding a user (e.g., a vehicle owner), a vehicle, financing terms, service history, historical purchases, and/or other related information), which may provide valuable insights into which events, and combinations of events, associated with users and/or households have historically led to purchase of vehicles. In some embodiments, user records from multiple entities are analyzed in developing scoring models, and, thus, are processed using the hygiene component. For example, a plurality of automobile dealerships may provide user records of their unique (and/or partially overlapping) prior, current, and/or potential customers for use by the modeling system discussed herein in developing scoring models. In such an embodiment, scoring models that are developed based on the user records from the plurality of automobile dealerships may be usable by each of the automobile dealerships, based on a predetermined sharing and use agreement between the entities.

Next, the modeling component 430 accesses the user records 410, which may have been updated via the hygiene component 420, perhaps even storing the updated user records 410 in a separate data store of updated user records, to detect events associated with users that may be indicative of general user loyalty and/or propensity to buy a vehicle.

In the embodiment of FIG. 4, the modeling component 430 accesses events, such as vehicle events 432, user events 434, industry events 436, data events 438, and/or other events in developing scoring models for application to the same users and/or future users (for which user record information was not used in generating the models).

Depending on the embodiment, various vehicle events 432 may be identified with reference to the user records 410 for purposes of generating scoring models. Such vehicle event data may be obtained from one or more internal and/or external data sources, such as those discussed elsewhere herein. In an example implementation, event data items that may be identified with reference to particular vehicles, users, and corresponding user records may include one or more of:

Accident Data
Airbag Deployed
Detrimental Auction Announcement
Failed Emission Inspection
Failed Safety Inspection
Fire Damage
Fleet/Lease
Frame/Structural Damage
Grey Market
Hail Damage
Insurance Loss
ISO Total Loss
Junk
Lemon/Manufacturer Buyback
Mileage Reading
Minor Damage Reported
Minor To Moderate Damage Reported
Moderate Damage Reported
Moderate To Severe Damage Reported
Motor Change
Non Detrimental Auction Announcement
Odometer Problem
Police Use
Prior Rental
Prior Taxi
Rebuilt/Rebuildable
Recycled
Repossessed
Salvage
Severe Accident
Theft
Theft Recovered
Title Damage
Vehicle Damage Reported As Disabling
Very Severe Damage Reported
Water Damage The vehicle events, such as those noted above, may be associated with additional data, such as a date when the vehicle event occurred, a date when the vehicle event was recorded in the data source in which it is obtained, a time since the vehicle event occurred, information regarding other vehicles associated with the vehicle event, and the like. In some embodiments, certain vehicle events may be indicative of a need for the vehicle owner and/or driver to acquire a new vehicle, potentially within a very short period of time after the vehicle event, such as within a few days of the vehicle event, although there may be a greater delay or passing of time between the vehicle event and any vehicle purchase or acquisition.

Depending on the embodiment, various user events 434 may be identified with reference to the user records 410 for purposes of generating scoring models. For example, user events may include events associated with changes in a user's life cycle or stage, such as that the user has recently had a baby or the user has recently moved to another residence. Other user events, such as a member of the user's household entering college, the user (or other household member) retiring, a major purchase by the user and/or household, a change of job, divorce, marriage, adoption, etc., may also be part of the user events 434 that are available and usable by the modeling component 430. Depending on the environment, the user events 434 may be identified in data received from one or more internal and/or external databases, such as, for example a marketing propensity database (e.g., indicating automotive purchase intent, online behavior, etc.), client engagement database (e.g., indicating type and frequency of outreach program), hyper-targeting database (e.g. indicating lease expiration information, loan payoff information, vehicle equity, etc., such as may be determined using any of the systems or methods discussed in co-pending U.S. patent application Ser. No. 15/914,983, titled "DATABASE SYSTEM FOR DYNAMICALLY GENERATING CUSTOMIZED MODELS," filed on Mar. 7, 2018 and U.S. patent application Ser. No. 16/246,036, titled "DATABASE SYSTEM FOR DYNAMICALLY GENERATING CUSTOMIZED MODELS," filed on Jan. 11, 2019, each of which is hereby incorporated by reference in its entirety and for all purposes), life events database (e.g., indicating marriage, birth, new driver, job change, move, etc.) and like.

The user events, such as those noted above, may be associated with additional data, such as a date when the user event occurred, a date when the user event was recorded in the data source in which it is obtained, a time since the user event occurred, information regarding other users, vehicles, circumstances, etc. associated with the user event, and the like. In some embodiments, certain user events may be indicative of a need or desire for the vehicle owner and/or driver to acquire a new vehicle, potentially within a very short period of time after the user event.

Depending on the embodiment, various industry events 436 may be identified for purposes of generating scoring models. For example, industry event data items may be accessed from various internal and/or external data sources, such as a recall database (e.g., indicating type, number, and/or frequency of recalls, etc.), an OEM loyalty database (e.g., indicating brand loyalty scores, customer satisfaction ratings, etc.), marketplace incentives databases (e.g., indicating type, number, and/or frequency of incentives, etc.), warranty databases (e.g., indicating warranty terms, conditions, extensions, etc.), and the like. For example, the industry events 436 may include data regarding general industry statistics on loyalty of users associated with particular automobile manufacturers. For example, a manufacturer loyalty data source may provide information indicating that owners of some vehicle makes are highly loyal to the brand, while owners of other vehicle makes are moderately or not noticeably loyal to the brand. The industry events, such as those noted above, may be associated with additional data, such as a date when the industry event occurred, a date when the industry event was recorded in the data source in which it is obtained, a time since the industry event occurred, information regarding users, vehicles, circumstances, etc. associated with the industry event, and the like. In some embodiments, certain industry events may be indicative of a user and/or household's loyalty propensities, such as a propensity to purchase a same make of automobile and/or a propensity to return to the same dealership from which one or more prior vehicle purchases were made.

Data events 438 may include various information, such as user phone numbers, mailing addresses, email addresses, VIN information, including indications of verification of VIN information that is performed by the hygiene component, that may be associated with a vehicle, user, user record and/or other data items that may be used by the modeling component.

With access to the various event data (e.g., vehicle event data, user event data, industry event data, data events, and/or the like) the modeling component 430 analyzes the event data to determine events (and/or combinations of events) that may be predictive of later vehicle purchases by users. In one embodiment, the modeling component generates weightings for individual event data items that may be included in the various event data, and the weightings may be combined to generate a score for the corresponding user. For example, occurrence of a particular vehicle event within a particular timeframe may be associated with a high score weight, generally indicative of an increase propensity of the corresponding user to be in the market to purchase a vehicle.

In some embodiments the modeling component generates a buy propensity scorecard that allows scoring of various event data associated with a user to predict a propensity of the user to buy a vehicle and a loyalty propensity scorecard that allows scoring of various event data associated with a user to predict a propensity of the user to be loyal to a particular (e.g., current) brand of vehicle. Advantageously, the modeling component may identify patterns of events that are similar across multiple users (e.g., event data associated with the multiple users) that precede an automobile purchase (e.g., by each of the multiple users). Thus, the scoring models may be used to predict when a user is likely to purchase an automobile, and provide timely information of an expected purchase.

Depending on the embodiment, the modeling component may execute a training model that identifies known purchases of automobiles, corresponding user data (e.g., including information in the corresponding user record and associated event data of the user). In some embodiments, machine learning techniques may be used to identify similarities between the user data indicating known purchases, such as events that occurred prior to the purchase events. By identifying similar events preceding automobile purchases, those events can be assigned a higher weight in a buy propensity model that can then be used to evaluate whether other users may be interested in purchasing a vehicle in the future (and potentially market to those users). Additionally, the machine learning techniques may be used to update and improve the scoring models based on outcomes associated with users for which propensity scores are generated. For example, if the propensity model determines that a particular user is likely to be in the market to purchase an automobile and the user does purchase an automobile the following week, user data of that user (and possibly of other user with similar positive outcomes) may be weighted even higher in the model.

Machine learning is a subset of artificial intelligence that iteratively learns from data without being explicitly programmed. Thus, a computing device configured to use machine learning techniques to perform an action can learn how to perform the action without being explicitly programmed. Accordingly, the machine learning techniques improve the functionality of the computing device itself because the machine learning techniques allow the computing device to learn, and thereby produce more accurate predictions of user behaviors, such as buy propensity and loyalty propensity, without being explicitly programmed.

In general, a human does not use machine learning techniques to perform any actions given that machine learning is a subset of artificial intelligence and humans use human or natural intelligence to perform actions, not artificial intelligence. For example, it would be impractical for a human (or even a group of humans) to develop and update scoring models to determine the particular user propensities using machine learning techniques without the use of a computer. For example, due to the fact that machine learning involves the iterative learning from data, a computing device that uses machine learning techniques to perform an action is not programmed by a human with explicit instructions that cause the action to be performed. Rather, a computing device that uses machine learning techniques to perform an action makes decisions or predictions in the course of performing the action based on a model learned or trained using sample data. Thus, there is not a known set of instructions that a human could simply follow to mimic the misuse detection performed using machine learning techniques.

Advantageously, use of scoring models on user records allows prompt notifications to an interested entity (e.g., a dealership) when a user's propensity scores are within a predetermined range (e.g., a buy propensity score is above a near-term buy threshold and a loyalty propensity score is above a loyalty threshold). Such notifications (or alerts) may be transmitted in several mediums and formats, such as via an alert module, discussed below.

When alerts are received (e.g., by a dealership), the recipient may take action immediately (or at a desired later time) to retain loyalty and business of the user identified in the notification. For example, the dealership can initiate a message to the user inviting them (and/or incentivizing them) back into the showroom or service lanes. For example, notifications may be provided directly to agents of the dealer that can call the identified user to open the lines of communication. Additionally, an email, text message, direct-to-application message, and/or direct mail may be transmitted to the user with special offers. Such notifications to users may be transmitted automatically by the dealership upon receipt of a notification, or in some embodiments the modeling system may transmit notifications directly to the user on behalf of the dealership, such as including an invitation and/or incentive for the user to contact the dealership.

In some embodiments, matching user records may be included in a targeting list that is used to activate digital media targeting campaigns to better reach the users when they are online at a variety of sites. Digital targeting techniques usable in conjunction with the matching user records may include those described in U.S. Pat. No. 9,767,309, filed Aug. 31, 2016 U.S. Pat. No. 10,019,593, filed Apr. 5, 2017, and U.S. patent application Ser. No. 16/005,396, filed Jun. 11, 2018, each titled "ACCESS CONTROL SYSTEM FOR IMPLEMENTING ACCESS RESTRICTIONS OF REGULATED DATABASE RECORDS WHILE IDENTIFYING AND PROVIDING INDICATORS OF REGULATED DATABASE RECORDS MATCHING VALIDATION CRITERIA." Each of the foregoing patents and applications is hereby incorporated by reference in its entirety and for all purposes.

Figure 5:
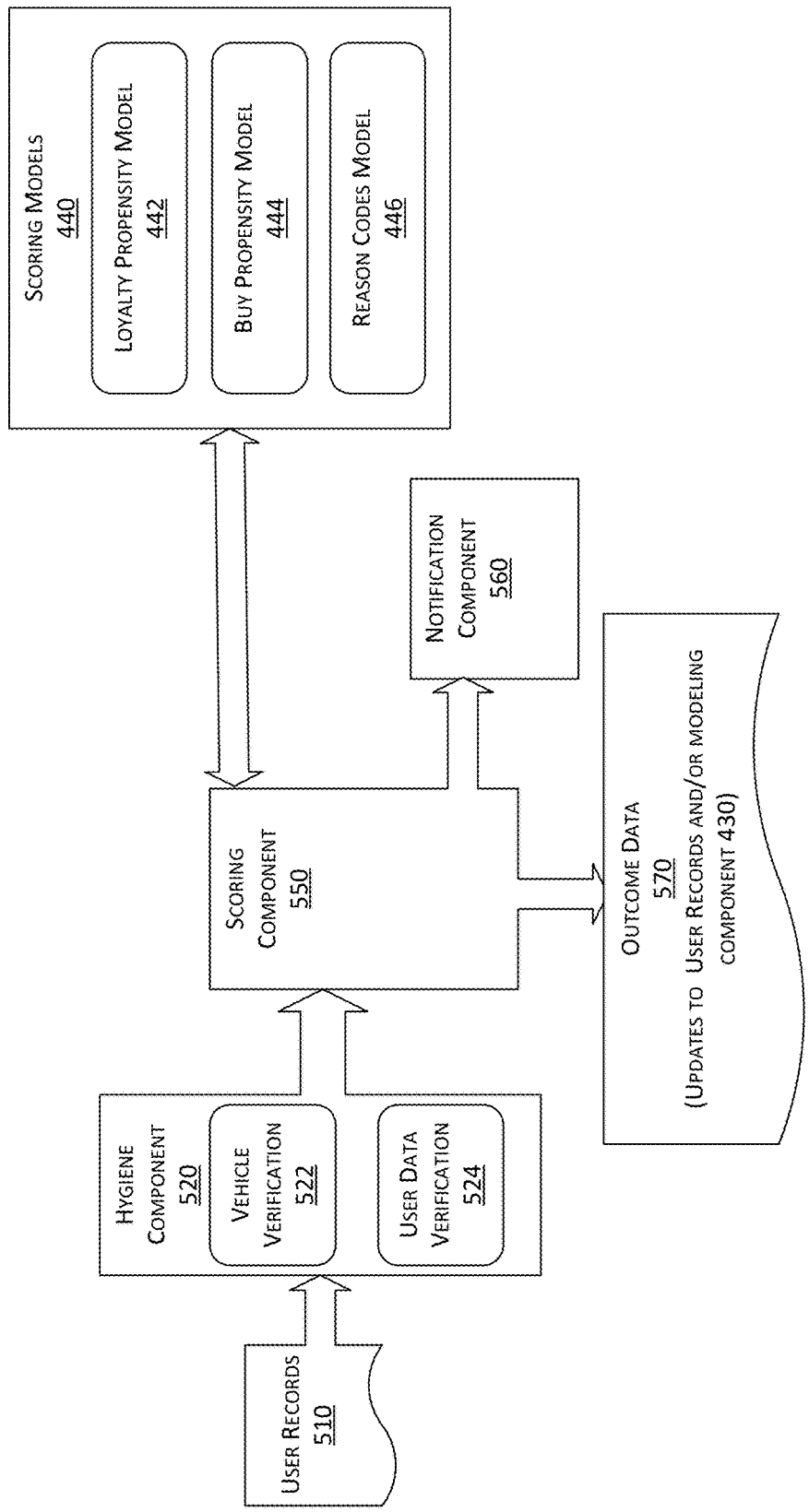
FIG. 5 is a block diagram illustrating components and example methods that may be performed to monitor and score user records using, e.g., the scoring models generated by the modeling component.

FIG. 5 is a block diagram illustrating components and example methods that may be performed to monitor and score user records using, e.g., the scoring models 440 generated by the modeling component 430. As noted above, the scoring models 440 are advantageously developed based on user data (including user records and related event data associated with users from a plurality of different internal and/or external data sources). In the example of FIG. 5, the scoring models 440 may be applied to user records that have been identified as potentially of interest to the requesting entity (e.g., a dealership). For example, when the dealership's user records database is updated with new customers and/or potential customers, those new user records may be analyzed by the hygiene component 520 to determine whether sufficient information is available to monitor the user for scores that match a particular targeting threshold that initiates action by the requesting entity.

In the example of FIG. 5, user records 510 may include a complete or updated listing of consumer information of an entity or multiple entities. For example, an automobile dealership may provide periodic updates to its customer/potential customer database in the form of user records and/or user record updates. These user records may be transmitted to a matching system (e.g., that includes the hygiene component 520, a scoring component 550, a notification component 560, and/or additional or fewer components). Such a matching system may be part of the dynamic modeling system 102 discussed herein or may be performed by one or more other internal or external computing systems. In the example of FIG. 5, the matching system is configured to identify new and/or updated user records meeting scoring thresholds (e.g., suggesting that a user or household associated with the user record may be in the market for a new automobile in the immediate future) base on the current scoring models, which may be dynamically updates as additional user data is accessible to the modeling component 430 (e.g., see FIG. 4).

Similar to the hygiene component 420 of FIG. 4, the hygiene component 520 of FIG. 5 may be configured to analyze user records to determine if there are profiles for which new or updated scoring should be performed. In some embodiments, the hygiene component 420 and hygiene component 520 are the same component, while in other embodiments the hygiene component 420 may perform different hygiene processes for purposes of identifying user records suitable for use in developing the scoring models, while hygiene component 520 performs other hygiene processes for purposes of identifying user records suitable for scoring current, dynamic, scoring models.

In the embodiment of FIG. 5, the hygiene component 520 may provide updates to the user records 510, such as may be stored by the requesting entity (e.g., a dealership that provided access to the user record) and/or by the matching system itself. For example, updates to formatting, content, etc. may be added to the corresponding user records 510.

In some embodiments, user records are transmitted to a third-party for some or all of the hygiene processing. In some embodiments, the requesting entity provides a minimum set of user data items that qualify a user record to be monitored for marketing triggers. For example, the user's name, address and VIN may be required data items for a matching system related to automobile customer retention and loyalty. Thus, for user records including that minimum set of user data, the hygiene component 520 may process, update, enhance, etc. the user records and provide the user record to the scoring component to initiate scoring. In some embodiments, the enhancement of user records, such as may be performed by the user data verification component 524, may include obtaining additional user data items from additional data stores. For example, a vehicle sales database may be accessed to obtain information regarding prior vehicle purchases of the user identified in the user record. With the minimum information of name, address, and VIN, information regarding historical vehicle purchases, such as purchase date, purchase price and financing terms may be acquired and used to update the user record. Similarly, information regarding service history of a vehicle may be retrieved from the same and/or a different data source. In some embodiments, the hygiene component 520 identifies and updates the user record with a living unit identifier associated with the particular user in the user record. For example, a living unit identifier (LUID) may indicate a household, where the household may include other members of that user's family, friends, etc. that live under the same roof.

The vehicle verification component 522 may, in some embodiments, add a verification flag to user records, such as a flag indicating that the VIN included in a user record from a dealership matches a VIN in an external database, and the user identification information (e.g., name, address, etc.) associated with the VIN in the received user record and the external database match (e.g., indicating that the VIN indicated in the user record really is associated with the corresponding person). For example, Experian's National Vehicle Database may be used to provide such VIN verification information and corresponding verification flags. Depending on the embodiment, the user data items required to match to set a VIN verification flag for a user record, may vary. For example, in some embodiments, such as states where restrictions are imposed on use of client data, only a ZIP Code from the user record and a ZIP code identified by a lookup of the VIN in the user record, need to match to provide a verification flag to the user record. In other implementations, such as for nonrestricted states, verification and flagging may include VIN, name, address, ZIP Code, and/or other user data.

The scoring component 550 is configured to generate one or more scores for the user record, such as a loyalty propensity score based on the loyalty propensity model 442 and/or a buy propensity score based on the buy propensity model 444. As discussed above, these scoring models may be generated based on analysis of a set of sample user data and updated dynamically as new user data is available. In the embodiment of FIG. 5, a reasons code model 446 may be evaluated to provide information or explanations regarding the generated propensity scores, such as factors that caused a score to be higher or lower than typical, e.g., explaining why an offer should be extended to an existing customer of a dealership.

In some embodiments, the scoring models comprise scorecards that determine score components based on each of a plurality of factors associated with the user record, which may then be aggregated, such as by summing, averaging, etc, to determine a final score. For example, in one embodiment, score components may be associated with vehicle events, user events, industry events, and or other events or user data. In one example, vehicle event codes are each associated with scores, such as in a range of 0-10, 0-100, A-F, low-high, or any other scoring range. In an example where low, medium, and high scores are used, certain activity codes that may indicate significant damage or loss of vehicle (e.g., codes associated with Insurance Loss, Fire Damage, Severe Accident, Title Damage, Airbag Deployed, etc.) are associated with an event score of high, generally indicating a higher propensity for the user to be in the market for a new vehicle. In some embodiments, the scores are multi-factored, such as based on the activity code and a time since the activity code was reported (or the event occurred). For example, a scoring algorithm of a buy propensity model may indicate that a vehicle factor, such as Severe Accident within the past 1-3 weeks or one month results in a high buy propensity score, while a Severe Accident 3-6 weeks or 2 months prior results in a medium buy propensity score, and a Severe Accident greater than 6 weeks or 2 months prior results in a Low buy propensity score. The portion of such a scoring algorithm may comprise code, instructions, rules, etc. in various formats. The code may generate a value or other "signal". In such example code, a "signal" level of medium or high may provide a sufficiently high buy propensity score (e.g., even without additional high or medium scores for other vehicle events) for the requesting entity to initiate a marketing effort towards the user. However, in some embodiments, even a high signal from a particular event activity (e.g., a Severe Accident within the last 20 days) may not satisfy the scoring criteria to trigger a marketing effort towards the user. For example, multiple vehicle event specific scores of a certain level (e.g., two or more High vehicle event scores) may be required to initiate notification to the requesting entity. Depending on embodiment, the threshold requirements for triggering a notification may be determined by the system (e.g., automatically by the modeling component 430) and/or the requesting entity, such that each requesting entity may establish different standards and criteria for when user records trigger a notification.

In some embodiments, a buy score component (or "score") may be determined based on user events associated with a user record. For example, information from a hypertargeting database that is included in user event data may be scored to determine a buy propensity score for a user record. In some embodiments, the hypertargeting database a tier for the user record, such as one of multiple (e.g., 1-10, A-H, etc.) tiers associated with different likelihoods of the user having a vehicle coming off a lease and being in the market to acquire a new vehicle. For example, the user event data may identify a hypertargeting tier matching a user record indicating that the user is highly likely to come off a lease within the next six months (or other time period defined by the system and/or requesting entity). In one example implementation, a tier of A or B may be associated with a High score component (e.g., that may be included in a buy propensity scorecard to develop an overall buy propensity), while tiers C-E Are associated with a Medium score component and tiers F-H are associated with a Low score component.

In some embodiments, the buy score component may be determined based on life events associated with a user record. For example, information from a user event data source may indicate whether records indicating that a user included in the user record has recently had a child or has become a new homeowner. Similar to the scoring levels noted above, depending on embodiment the scores for life events may be set as various levels, such as by the modeling component 430 automatically and/or the requesting entity. In some limitations, a time since the life event may impact whether a score component is associated with a user record and/or a level (e.g., low versus medium versus high) of an indicated score component. Additionally, the score criteria may be adjusted dynamically based on updates to the buy propensity model 444 by the modeling component 430.

In some embodiments, a loyalty score component may be determined based on one or more user events 434, vehicle events 432, industry events 436, and/or data events 438. In one example implementation, industry event data may include industry data indicating loyalty propensities associated with particular makes of automobiles. The loyalty propensity model 442 may include scoring levels associated with such industry loyalty data. For example, the loyalty propensity model 430 (which may be periodically and/or dynamically updated by the modeling component 430) may indicate a High loyalty score component for user records indicating current (and/or passed in some limitations) ownership of certain makes of automobiles, a Medium loyalty score component for user records indicating ownership of another set of automobile makes, and a Low loyalty score component for user records indicating ownership of a third set of automobile makes. Depending on embodiment, additional loyalty score components may be established (e.g., 0-10, 0-100, A-F, etc.), and loyalty score components may be associated with various other event data.

In the example of FIG. 5, the reasons code model 446 may be evaluated to provide information or explanations regarding the generated propensity scores, such as score components that contributed to a score being higher or lower than typical, e.g., explaining why an offer should be extended to an existing customer of a dealership.

As shown in FIG. 5, outcome data 570 is output from the scoring component 550, such as to update the user profiles 510 for use by the modeling 438 in updating one or more of the scoring models 440. For example, the outcome data 570 may include indications of propensity scores (e.g., buy scores comprising one or more buy score components and/or loyalty scores comprising one or more loyalty score components) generated by the scoring component 550 for one or more user profiles. Thus, the propensity scores may be added to the user records 510 (and/or other event databases) for use in updating the scoring models 440, such as may be performed using machine learning techniques. Accordingly, the outcome data 570 provides a feedback path wherein calculated estimator propensities may be associated with actual purchase outcome data (e.g., from updates by the requesting entity to user profiles indicating later purchases of vehicles) to optimize the scoring models 440.

The notification component 560 is configured to transmit notifications (also referred to as "alerts") to a request and/or other entity or user, including one or more propensity scores, such as a loyalty propensity score and/or buy propensity score, as well as reason codes.

The notification component 560 may include an alert module, such as is discussed further below. In some embodiments, the notification component 560 transmits user interface data (that may be rendered on a user device and/or that includes raw data that is readable in a user interface template on a user device) that is transmitted to the requesting entity. Example, scoring of a user profile results in a buy propensity score above a predetermined threshold (e.g., set by the requesting entity), a notification indicating user information may be transmitted to the requesting entity, such as immediately after the buy propensity score is calculated (e.g., within seconds or minutes of calculation of the propensity score). In this way, the notifications are delivered to the requesting entity in a timely manner that allows the requesting entity to take action with reference to the user to maximize opportunities. Depending on embodiment, such notifications may be delivered via email, text message, push notifications to the particular mobile application (e.g., a CRM or lead monitoring application), or other delivery channel. FIG. 7 illustrates several example user interfaces that are delivered to a mobile device of a requesting entity to provide information regarding a recently scored user profile.

In the embodiment of FIG. 7, a first user interface 710 illustrates an example home screen 710 of an automobile user profile management application. In this example user interface, the requesting entity is provided with options to view new leads by pressing a "view leads" button 712, which may navigate the user interface to example user interface 720. User interface 720 includes a list of new leads, such as recently scored user profiles that met by propensity and/or loyalty propensity score thresholds. In this embodiment, the new leads are each associated with a link that provides further information regarding the newly. For example, user interface 730 includes detailed information regarding the first newly in user interface 720, such as in response to the user selecting new lead 721. The lead detail interface 730 includes information such as event data that cause the user profile to be provided to the requesting entity. In the example user interface 730, a lead event, event date, as well as vehicle information associated with the event, are all provided for easy access by the requesting entity. In example user interface 730, the loyalty propensity score and the buy propensity score for the user profile are also displayed, with colors indicating a general trend in direction of those propensity scores. For example, the green loyalty indicator for the loyalty propensity score indicates that the score is trending upward, while the buy propensity score in red indicates the buy propensity score is trending downward. The user interface 730 also includes a contact button 731 that may be selected to initiate a call, email, text message, push message, etc., to the user. For example, in one embodiment in response to selection of the contact button 731, a user interface providing contact options is displayed on the device, such as a call or text options, wherein upon selection of one of the options a call or text to the user is initiated. For example, when the call button is selected, a call to the user via the mobile device is started. In example of a survey 730, user data 732 is further provided to aid the requesting entity in determining how to best approach the user.

In the example of FIG. 7, the user interface 710 also includes a communicate option 714, which may be configured to initiate communications with one or more of the users identified in the new leads and/or employees of the requesting entity. An offers option 716 causes display of user interface 740, which displays offers that have been extended to users. A lead management option 718 causes display of user-interface 750, which includes several user management options, including an option to view leads, generate a report on leads, and/or export lead information to a CRM. And to manage leads (e.g., see user interface 750).

In some embodiments, a requesting entity may choose to receive periodic reports regarding scoring of user profiles, rather than or in addition to real-time notifications such as those discussed above with reference to FIG. 7. For example, the notification component 560 may periodically (e.g., weekly, monthly, etc.) generate a file (e.g., an Excel file) that includes information regarding each user record scored during the prior time period. For example, information such as name, address, VIN, buy propensity score (and/or individual buy propensity score components), loyalty propensity score (and/or individual loyalty propensity score components), buy factors, and any other related user data, may be included in such a report. In some embodiments, buy factors may include vehicle events (such as accidents, total loss of vehicle, etc.) and user events (such as moves, births, etc.).

Figure 6:
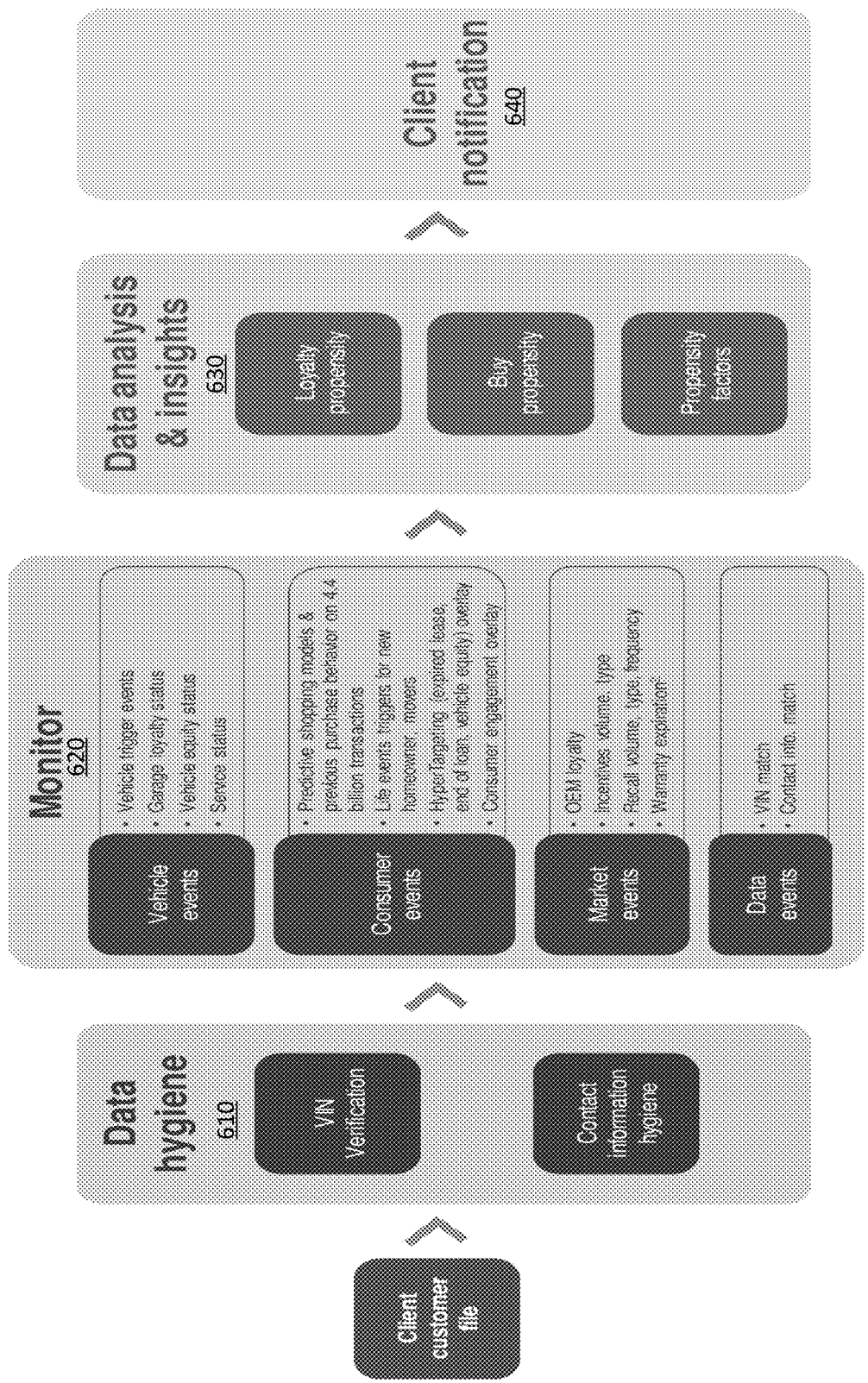
FIG. 6 is a block diagram illustrating various components that may exchange and process data in generating and applying scoring models.

FIG. 6 is a block diagram illustrating various components that may exchange and process data in generating and applying scoring models. In general, the components illustrated in FIG. 6 correlate with certain components in FIGS. 4 and/or 5. For example, the data hygiene component 620 may perform some, all, or additional processes as hygiene components 420 and/or 520, monitor component 630 may perform some, all, or additional processes as the modeling component 430, the data analysis and insights module 640 may perform some, all, or additional processes as the scoring component 550 accessing the scoring models 440, and the client notification component 650 may perform some, all, or additional processes as the notification component 560.

VI. Example Alert Module

In some embodiments, the alert and/or notification is automatically transmitted to the device operated by the entity associated with the alert and/or notification (e.g., a dealership that periodically provides its customer list for monitoring of opportunities to contact its customers). The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a data analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Figure 8:
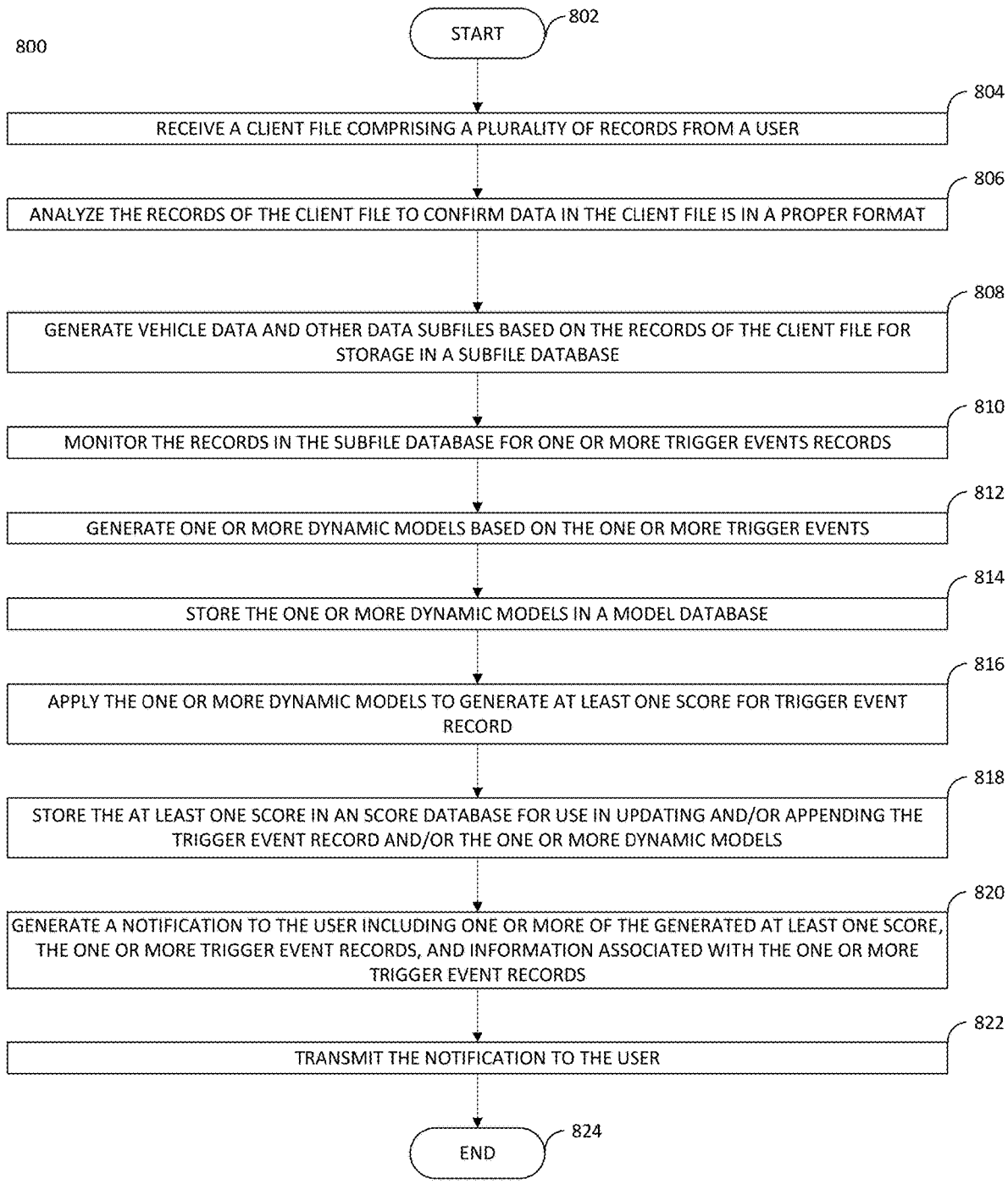
FIG. 8 is a flow chart for a method of processing data using dynamic models, in accordance with exemplary embodiments described herein.

FIG. 8 is a flow chart for a method 800 of processing data using dynamic models, in accordance with exemplary embodiments described herein. In some embodiments, any of the components described herein (for example, the CPU 302, the I/O interfaces and devices 304, the user interface module 314, and/or the mass storage device 310) of the dynamic modeling system 102 as shown in FIG. 2) may perform either or both of these methods. The method 800 of FIG. 8 begins at block 802.

At block 804, the CPU 302, the user interface module 314, or the I/O interfaces and devices 304 may receive a file comprising a plurality of records from a user. In the example use case identified above, the file may comprise the dealership client information file and the user may be an employee of the dealership or may be representative of the dealership itself. At block 806, the CPU 302 may analyze the records of the received file to confirm that data in the records in the file is in a proper (for example, usable) format. If the data is not in the proper format, the CPU 302 may modify the data to put it in the proper format.

At block 808, the CPU 302 may generate one or more subfiles based on the data in the records of the received file. For example, in the example use case above, the CPU 302 may analyze the client file and generate a vehicle data subfile and a user data subfile based on one or more filters, such as the vehicle filter 204 and the data filter 206. Furthermore, the CPU 302 may store the generated subfiles in a subfile database (for example, in the mass storage device 310). At block 810, the CPU may monitor the subfiles and records in the subfile database for one or more trigger event records. In some embodiments, in the example use case described above, the trigger event records may be any record that indicates one or more of a vehicle event, a user event, an industry event, or a data event.

At block 812, if the CPU 302 identifies one or more trigger event records, the CPU 302 may generate one or more dynamic models based on the one or more trigger events. In some embodiments, as described above in relation to the example use case, one or more trigger event records in the client information file from the dealership may cause the CPU 302 to generate one or more models useful to predict a likelihood of users associated with the one or more trigger event records buying a vehicle in the foreseeable future (for example, based on an event identified in the one or more trigger event records). In some embodiments, the one or more dynamic models may include a loyalty propensity model, a buy propensity model, and a reason codes model. At block 814, the generated one or more dynamic models is stored, by the CPU 302 and/or the mass storage device 310, in a model database.

At block 816, the CPU 302 may apply the one or more dynamic models to generate at least one score for the one or more trigger event records. The resulting score may correspond to a likelihood that, as a result of the one or more trigger event records, a particular action occurs. For example, in the example use case of dealership client information, the score generated by the one or more models may indicate a likelihood that a client associated with a vehicle record indicating major damage to the client's vehicle is high (or relatively high as compared to records with less damage, etc.). Additionally, the score generated may include or represent loyalty propensity, buy propensity, or scores generated based on reason codes. At block 818, the generated score(s) may be stored in a score database, for example by the CPU 302 or the mass storage device 310. In some embodiments, the generated score may also be used to update and/or appended to the trigger event record and/or the one or more dynamic models generated based on the trigger event record.

At block 820, the CPU 302 or the report module 316 may generate a notification to the user including one or more of the generated at least one score, the one or more trigger event records, and information associated with the one or more trigger event records. For example, in the example use case of the dealership client information, the notification may be generated to the user that supplied the initial client information file. The generated notification may include a score indicating one or more of the buy or loyalty propensity or a reason codes score based on details of the trigger event record. Alternatively, or additionally, the notification may include information from the trigger event record, such as what event is identified by the record, and/or include contact information for the client identified by the trigger event record. The user may use the information in the notification to generate a potential lead for a vehicle sale, and so forth. At block 822, the notification is transmitted to the user that provided the client file, before ending at block 824.

VII. Computing Systems

Any of the components or systems described herein may be controlled by operating system software, such as Windows XP, Windows Vista, Windows 7, Windows 8, Windows Server, UNIX, Linux, SunOS, Solaris, iOS, Android, Blackberry OS, or other similar operating systems. In Macintosh systems, the operating system may be any available operating system, such as MAC OS X. In other embodiments, the components or systems described herein may be controlled by a proprietary operating system. Conventional operating systems control and schedule computer processes for execution, perform memory management, provide file system, networking, I/O services, and provide a user interface, such as a graphical user interface ("GUI"), among other things.

Computing devices, which may comprise the software and/or hardware described above, may be an end user computing device that comprises one or more processors able to execute programmatic instructions. Examples of such computing devices are a desktop computer workstation, a smart phone such as an Apple iPhone or an Android phone, a computer laptop, a tablet PC such as an iPad, Kindle, or Android tablet, a video game console, or any other device of a similar nature. In some embodiments, the computing devices may comprise a touch screen that allows a user to communicate input to the device using their finger(s) or a stylus on a display screen.

The computing devices may also comprise one or more client program applications, such as a mobile "app" (for example, iPhone or Android app) that may be used to visualize data, and initiate the sending and receiving of messages in the computing devices. This app may be distributed (for example downloaded) over the network to the computing devices directly or from various third parties such as an Apple iTunes or Google Play repository or "app store." In some embodiments, the application may comprise a set of visual interfaces that may comprise templates to display vehicle history reporting and financing information. In some embodiments, as described above, visual user interfaces may be downloaded from another server or service. This may comprise downloading web page or other HTTP/HTTPS data from a web server and rendering it through the "app". In some embodiments, no special "app"

need be downloaded and the entire interface may be transmitted from a remote Internet server to computing device, such as transmission from a web server to an iPad, and rendered within the iPad's browser.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the vehicle history reporting and financing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some embodiments, the system distinguishes between the initial transmission of loan application data required for user interfaces, and subsequent transmissions of user interface data so that it may transmit only portions that are necessary to update a vehicle history reporting and financing user interface. This may be done, for example, using an XMLHttpRequest (XHR) mechanism, a data push interface, Asynchronous JavaScript and XML ("Ajax"), or other communication protocols.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process blocks may be stored, persistently or otherwise, in any type of non-transitory computer storage such as, for example, volatile or non-volatile storage.

The various features and processes described above may be used independently of one another, or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or blocks. Thus, such conditional language is not generally intended to imply that features, elements and/or blocks are in any way required for one or more embodiments or that one or more embodiments necessarily include logic for deciding, with or without user input or prompting, whether these features, elements and/or blocks are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or blocks in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the system 100, a computing device 101, and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The I/O devices and interfaces provide a communication interface to various external devices and systems. The computing system may be electronically coupled to a network, which comprises one or more of a LAN, WAN, the Internet, or cloud computing networks, for example, via a wired, wireless, or combination of wired and wireless, communication links. The network communicates with various systems or other systems via wired or wireless communication links, as well as various data sources.

Information may be provided to the dynamic modeling system 102 over the network 110 from one or more data sources including, for example, data stores 104 and 108 or internal source information database. In addition to the sources that are illustrated in FIG. 2, the network may communicate with other data sources or other computing devices. The data sources may include one or more internal or external data sources. In some embodiments, one or more of the databases or data sources may be implemented using an open-source cross-platform document-oriented database program, such as a Mongo dB, a relational database, such as IBM DB2, Sybase, Oracle, CodeBase and Microsoft® SQL Server as well as other types of databases such as, for example, a flat file database, an entity-relationship database, and object-oriented database, and/or a record-based database.

It is recognized that the term "remote" may include systems, data, objects, devices, components, or modules not stored locally, that are not accessible via the local bus. Thus, remote data may include a system that is physically stored in the same room and connected to the computing system via a network. In other situations, a remote device may also be located in a separate geographic area, such as, for example, in a different location, country, and so forth.

VIII. Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor.

The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or blocks. Thus, such conditional language is not generally intended to imply that features, elements and/or blocks are in any way required for one or more embodiments or that one or more embodiments necessarily include logic for deciding, with or without user input or prompting, whether these features, elements and/or blocks are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following.

What is claimed is:

1. A data processing system comprising:
   a client database including a plurality of client records relating to a plurality of vehicles associated with a plurality of clients, wherein each client record includes contact information for a client and information relating to at least one vehicle associated with the client;
   a hardware processor configured to execute computer-executable instructions to:
   verify that each of the plurality of client records conforms to a set of formatting guidelines;
   apply a first data filter to each of the plurality of client records to generate a vehicle data subfile comprising records for each vehicle associated with one of the clients having a record in the client database;
   apply a second data filter to the plurality of client records to generate a client data subfile comprising information for each of the clients having a record in the client database;
   monitor the vehicle data subfile and the client data subfile for one or more trigger event records, wherein the one or more trigger event records identifies one or more of: a vehicle event or a client event;
   generate a first dynamic model for determining a likelihood that a client associated with the one or more trigger event records will perform a particular action, based on the one or more trigger events and associated with one or more of: a loyalty propensity predicting a likelihood of being loyal to a vehicle make with which a respective client is already associated, or buy propensity predicting a likelihood of acquiring a vehicle with which the respective client is not already associated;
   apply the first dynamic model to generate at least one score value associated with the at least one trigger event record, wherein the at least one score value provides a value representative of the predicted likelihood that the client will perform the particular action;
   generate a notification including one or more of: the generated at least one score value, the one or more trigger event records, or information associated with the one or more trigger event records; and
   an electronic input/output communication interface configured to receive the plurality of client records from a user device and transmit the instructions for rendering a user interface providing the notification on the user device.

2. The data processing system of claim 1, wherein the hardware processor verifies that the plurality of client records conform to the set of formatting guidelines by analyzing the plurality of records to identify that each record includes one or more expected fields or an expected identifier and wherein the hardware processor is further configured to execute computer-executable instructions to update or remove any record that does not include the one or more expected fields or the expected identifier in the plurality of client records.

3. The data processing system of claim 1, wherein the information in the client data comprises one or more of: client contact information, client life events information, client purchase behavior information, or client loan information.

4. The data processing system of claim 1, wherein each of the records in the vehicle data subfile comprises one or more of: vehicle information, garage loyalty information, vehicle equity information, or vehicle service information.

5. The data processing system of claim 1, wherein the vehicle event comprises one or more of: an accident, a total loss of the vehicle, a theft of the vehicle, a vehicle title change, a vehicle equity change, a garage loyalty change, or a vehicle service event.

6. The data processing system of claim 1, wherein the client event comprises one or more of: a change in a client shopping model, a particular client purchase event, or a life event.

7. The data processing system of claim 1, wherein performing the particular action comprises acquiring a vehicle with which the client is not currently associated.

8. The data processing system of claim 1, wherein the at least one score value comprises a loyalty propensity value that predicts a likelihood of the client being loyal to a make of vehicle with which the client is already associated and a buy propensity value that predicts a likelihood of the client acquiring a vehicle with which the client is not already associated.

9. A computer implemented method comprising:
accessing, by a database system, a client database including a plurality of client records relating to a plurality of vehicles associated with a plurality of clients, wherein each client record includes contact information for a client and information relating to at least one vehicle associated with the client;
verifying that each of the plurality of client records conforms to a set of formatting guidelines;
applying a first data filter to each of the plurality of client records to generate a vehicle data subfile comprising records for each vehicle associated with one of the clients having a record in the client database;
applying a second data filter to the plurality of client records to generate a client data subfile comprising information for each of the clients having a record in the client database;
monitoring the vehicle data subfile and the client data subfile for one or more trigger event records, wherein the one or more trigger event records identifies one or more of: a vehicle event or a client event;
generating a first dynamic model for determining a likelihood that a client associated with the one or more trigger event records will perform a particular action, based on the one or more trigger events and associated with one or more of: a loyalty propensity predicting a likelihood of being loyal to a vehicle make with which a respective client is already associated, or buy propensity predicting a likelihood of acquiring a vehicle with which the respective client is not already associated;
applying the first dynamic model to generate at least one score value associated with the at least one trigger event record, wherein the at least one score value provides a value representative of the predicted likelihood that the client will perform the particular action;
generating a notification including one or more of: the generated at least one score value, the one or more trigger event records, or information associated with the one or more trigger event records; and
transmitting the notification to a user device, the notification including instructions for rendering a user interface providing the one or more of: the generated at least one score value, the one or more trigger event records, or the information associated with the one or more trigger event records.

10. The computer implemented method of claim 9, wherein verifying that the plurality of client records conform to the set of formatting guidelines comprises analyzing the plurality of records to identify that each record includes one or more expected fields or an expected identifier and further comprising updating or removing any record that does not include the one or more expected fields or the expected identifier in the plurality of client records.

11. The computer implemented method of claim 9, wherein the information in the client data comprises one or more of: client contact information, client life events information, client purchase behavior information, or client loan information.

12. The computer implemented method of claim 9, wherein each of the records in the vehicle data subfile comprises one or more of: vehicle information, garage loyalty information, vehicle equity information, vehicle service information.

13. The computer implemented method of claim 9, wherein the vehicle event comprises one or more of: an accident, a total loss of the vehicle, a theft of the vehicle, a vehicle title change, a vehicle equity change, a garage loyalty change, or a vehicle service event.

14. The computer implemented method of claim 9, wherein the client event comprises one or more of: a change in a client shopping model, a particular client purchase event, or a life event.

15. The computer implemented method of claim 9, wherein performing the particular action comprises acquiring a vehicle with which the client is not currently associated.

16. The computer implemented method of claim 9, wherein the at least one score value comprises a loyalty propensity value that predicts a likelihood of the client being loyal to a make of vehicle with which the client is already associated and a buy propensity value that predicts a likelihood of the client acquiring a vehicle with which the client is not already associated.

17. A non-transitory computer storage medium storing computer-executable instructions that, when executed by a processor, cause the processor to at least:
access a client database including a plurality of client records relating to a plurality of vehicles associated with a plurality of clients, wherein each client record includes contact information for a client and information relating to at least one vehicle associated with the client;
verify that each of the plurality of client records conforms to a set of formatting guidelines;
apply a first data filter to each of the plurality of client records to generate a vehicle data subfile comprising records for each vehicle associated with one of the clients having a record in the client database;
apply a second data filter to the plurality of client records to generate a client data subfile comprising information for each of the clients having a record in the client database;
monitor the vehicle data subfile and the client data subfile for one or more trigger event records, wherein the one or more trigger event records identifies one or more of: a vehicle event or a client event;
generate a first dynamic model for determining a likelihood that a client associated with the one or more trigger event records will perform a particular action, based on the one or more trigger events and associated with one or more of: a loyalty propensity predicting a likelihood of being loyal to a vehicle make with which a respective client is already associated, or buy propensity predicting a likelihood of acquiring a vehicle with which the respective client is not already associated;
applying the first dynamic model to generate at least one score value associated with the at least one trigger event record, wherein the at least one score value provides a value representative of the predicted likelihood that the client will perform the particular action;
generating a notification including one or more of: the generated at least one score value, the one or more trigger event records, or information associated with the one or more trigger event records; and transmitting the notification to a user device, the notification including instructions for rendering a user interface providing the one or more of: the generated at least one score value, the one or more trigger event records, or the information associated with the one or more trigger event records.

18. The non-transitory computer storage medium of claim 17, wherein the information in the client data comprises one or more of: client contact information, client life events information, client purchase behavior information, or client loan information.

19. The non-transitory computer storage medium of claim 17, wherein each of the records in the vehicle data subfile comprises one or more of: vehicle information, garage loyalty information, vehicle equity information, or vehicle service information.

20. The non-transitory computer storage medium of claim 17, wherein the vehicle event comprises one or more of: an accident, a total loss of the vehicle, a theft of the vehicle, a vehicle title change, a vehicle equity change, a garage loyalty change, or a vehicle service event.

21. The non-transitory computer storage medium of claim 17, wherein the client event comprises one or more of: a change in a client shopping model, a particular client purchase event, or a life event.

22. The non-transitory computer storage medium of claim 17, wherein performing the particular action comprises acquiring a vehicle with which the client is not currently associated.

23. The non-transitory computer storage medium of claim 17, wherein the at least one score value comprises a loyalty propensity value that predicts a likelihood of the client being loyal to a make of vehicle with which the client is already associated and a buy propensity value that predicts a likelihood of the client acquiring a vehicle with which the client is not already associated.

* * * * *